(12) United States Patent
Itoh

(10) Patent No.: US 6,671,103 B2
(45) Date of Patent: Dec. 30, 2003

(54) ZOOM LENS AND OPTICAL APPARATUS USING THE SAME

(75) Inventor: Yoshinori Itoh, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/032,195

(22) Filed: Dec. 21, 2001

(65) Prior Publication Data

US 2002/0154908 A1 Oct. 24, 2002

(30) Foreign Application Priority Data

Dec. 27, 2000 (JP) .................................... 2000-398633
Feb. 22, 2001 (JP) .................................... 2001-046419

(51) Int. Cl.$^7$ ............................................. G02B 15/14

(52) U.S. Cl. .................. 359/689; 359/680; 359/681; 359/682; 359/676; 359/683; 359/684

(58) Field of Search ................... 359/680–682, 359/683, 689, 676, 708, 713–716, 739, 684

(56) References Cited

U.S. PATENT DOCUMENTS

| | | | | | |
|---|---|---|---|---|---|
| 6,014,267 | A | * | 1/2000 | Tsurutani et al. | 359/689 |
| 6,124,984 | A | * | 9/2000 | Shibayama et al. | 359/689 |
| 6,304,389 | B1 | * | 10/2001 | Shibayama | 359/689 |
| 6,308,011 | B1 | * | 10/2001 | Wachi et al. | 359/689 |
| 2002/0027721 | A | | 3/2000 | Mihara | 359/656 |

\* cited by examiner

*Primary Examiner*—Georgia Epps
*Assistant Examiner*—M. Hasan
(74) *Attorney, Agent, or Firm*—Morgan & Finnegan LLP

(57) ABSTRACT

A zoom leas includes a first lens unit of a negative optical power and a second and third lens unit each of a positive optical power. The second lens unit consists of a first and second lens sub unit, each of a positive optical power arranged respectively on an object side and an image side. Zooming is effected by moving the lens units such that the distance between the first and second lens unit is smaller at a telephoto end than at a wide-angle end and that the distance between the second and third lens unit is larger. Focusing is effected by moving the second lens sub unit or the third lens unit where, when focusing on an object at infinity, the distance between the first lens sub unit and the second lens sub unit and the focal length of the entire system satisfy a predetermined condition.

38 Claims, 17 Drawing Sheets

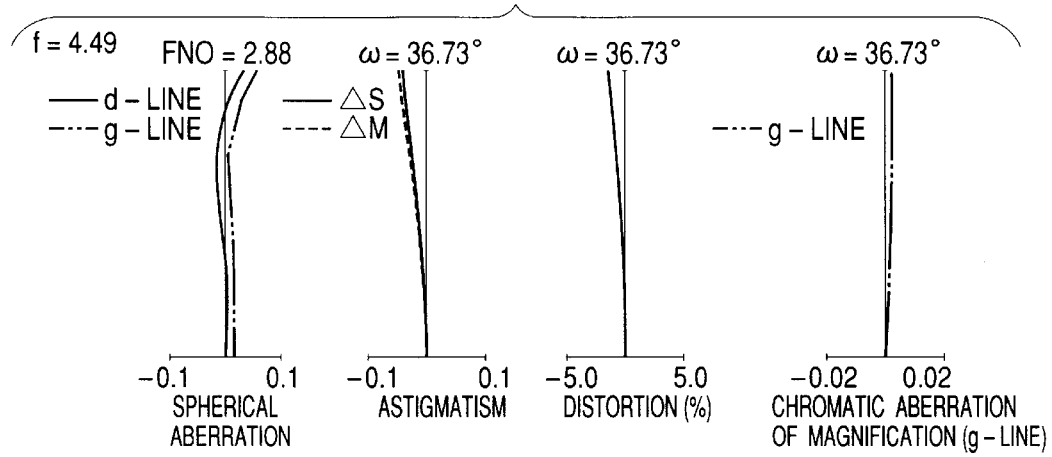
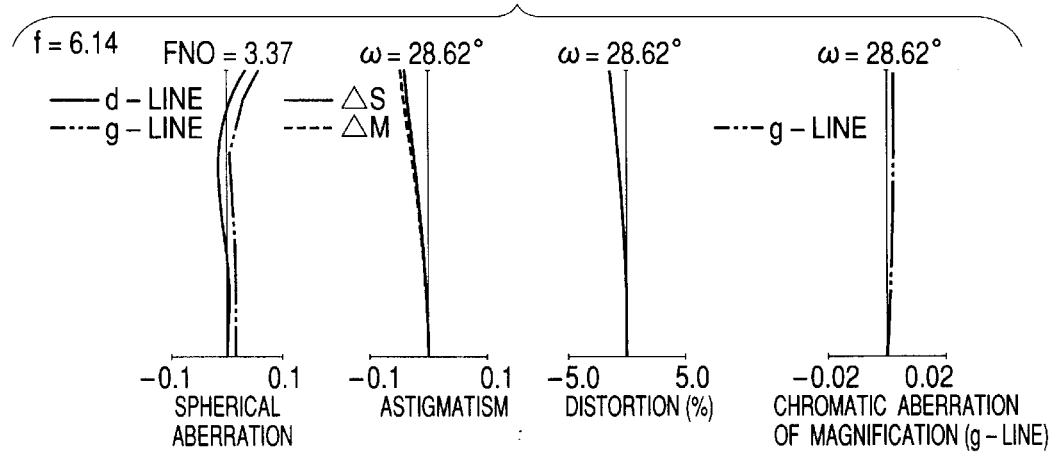
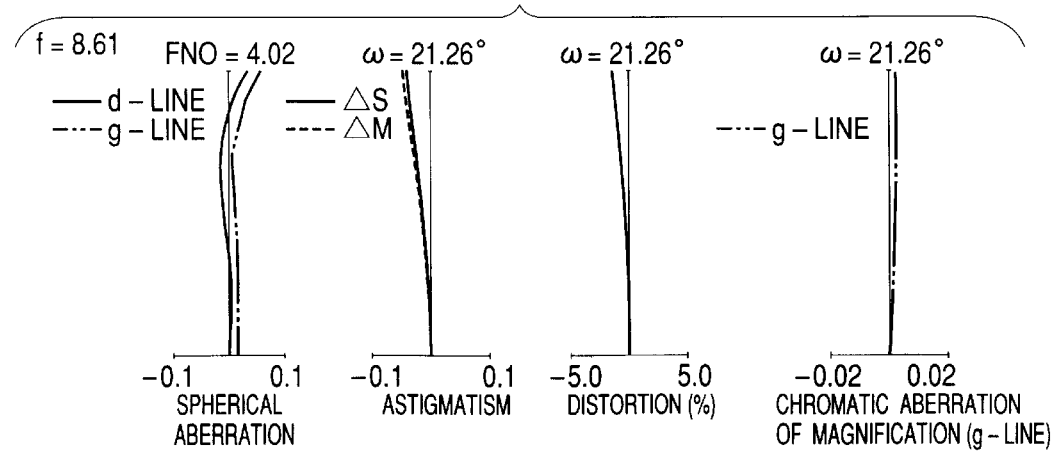

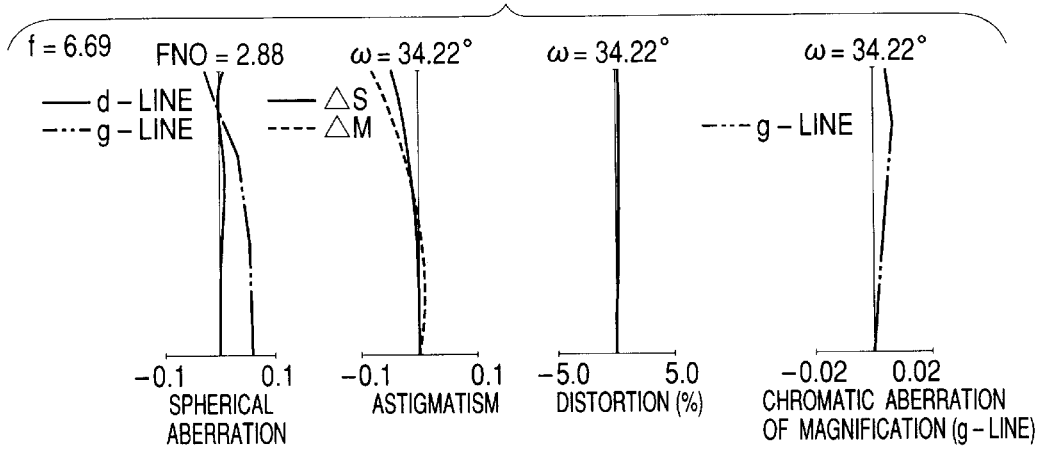
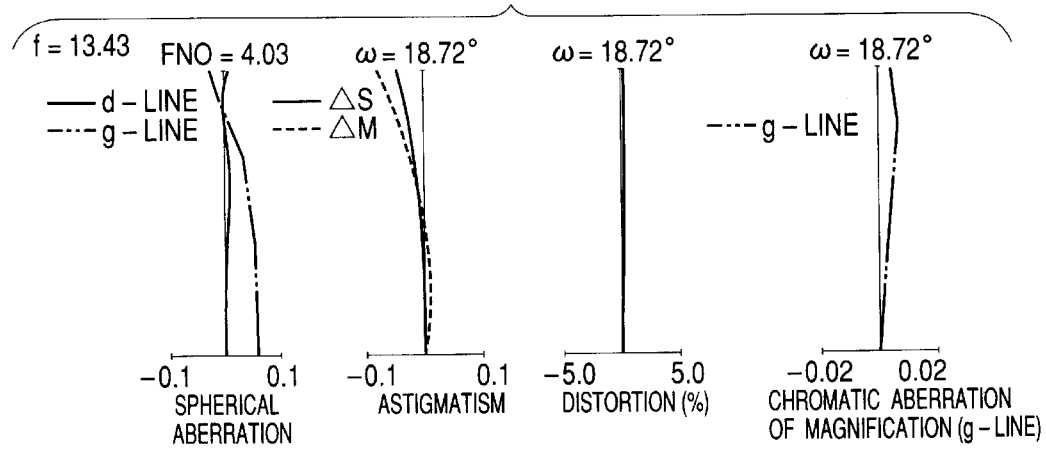
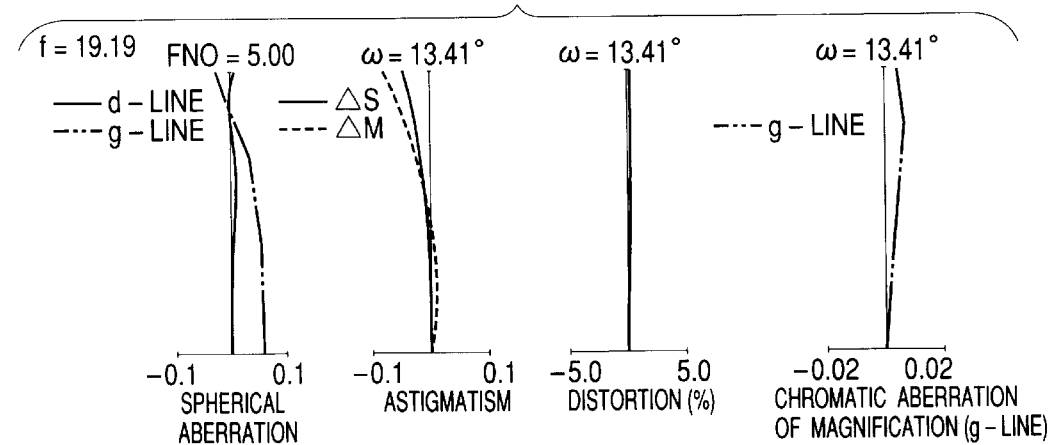

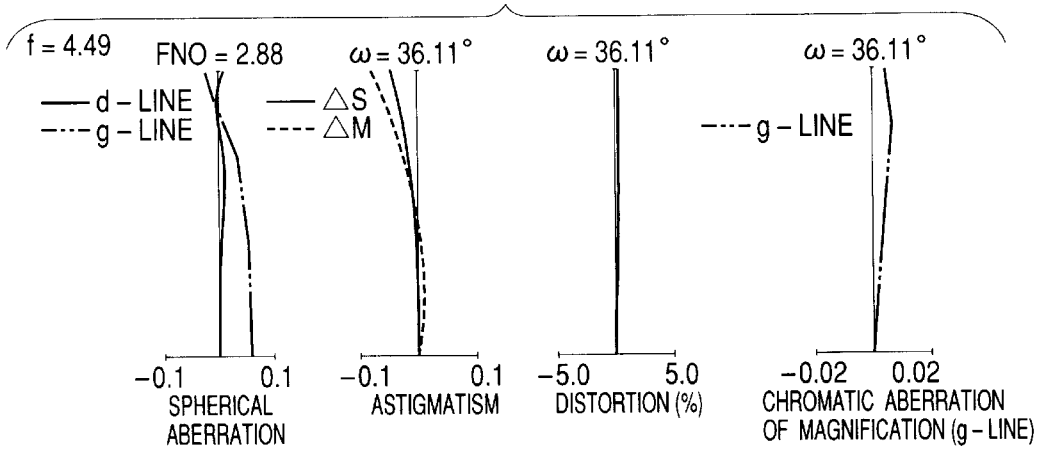
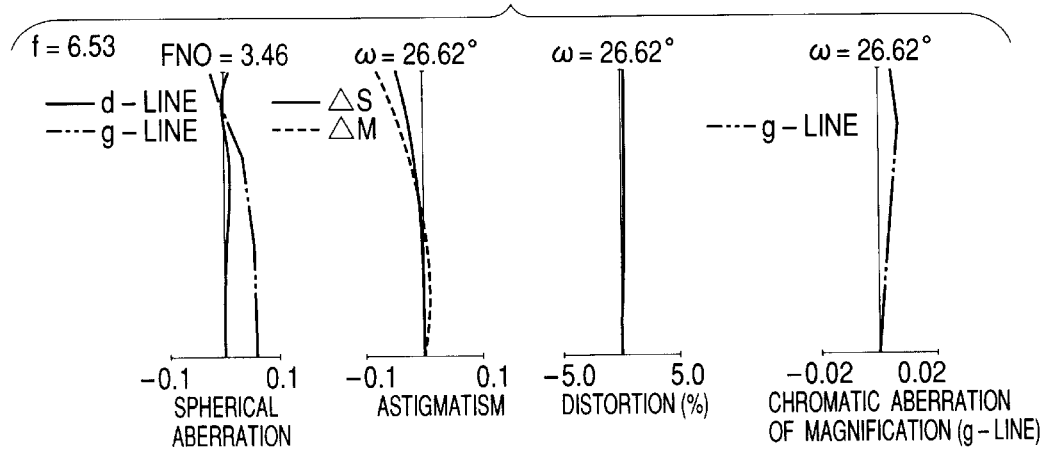
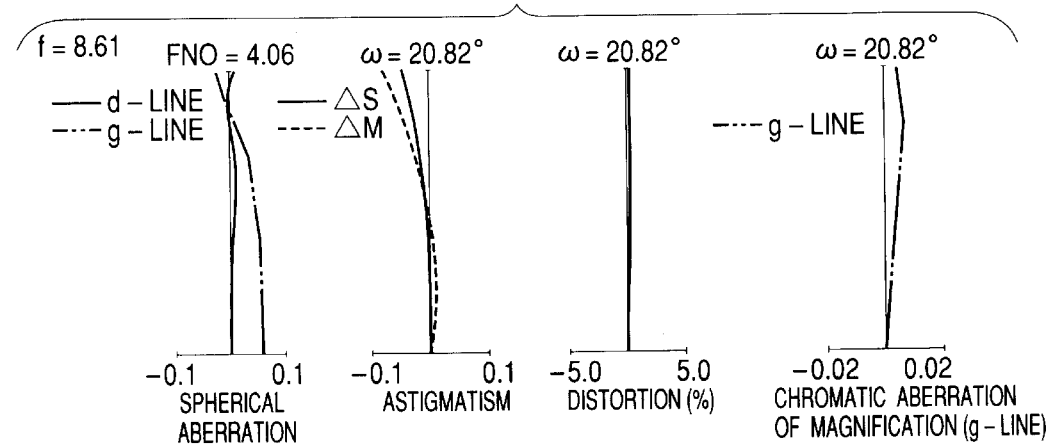

ZOOM LENS AND OPTICAL APPARATUS USING THE SAME

BACKGROUND OF THE INVENTION

1. Field of the Invention

The present invention relates to a zoom lens suitable for use in a digital still camera, a video camera, a silver halide camera or the like and, in particular, to a zoom lens in which an increase in photographing angle of view and a reduction in total lens length are achieved and which is superior in portability.

2. Related Background Art

Nowadays, as a result of the functional advancement of cameras (optical apparatuses) using a solid-state image sensor, such as a video camera, a digital camera, and an electronic still camera, there is a demand for compatibility between high optical performance of the optical system used therein and a reduction in its size.

Further, in a camera of this type, it is necessary to arrange between the lens rearmost portion and the image sensor various optical members, such as a low-pass filter and a color correction filter, so that the optical system used therein is required to have a lens system with a relatively long back focus. Further, in the case of a camera using a color image sensor, the optical system used therein is required to have satisfactory image-side telecentric characteristics in order to prevent color shading.

There has been proposed in Japanese Patent Application Laid-open No. 63-135913 (corresponding to U.S. Pat. No. 4,838,666), Japanese Patent Application Laid-open No. 7-261083, etc. a zoom lens system consisting of three lens units in a negative-positive-positive optical power arrangement satisfying both back focus and telecentric characteristics.

Japanese Patent Application Laid-open No. 7-52256 discloses a zoom lens consisting of three lens units in a negative-positive-positive optical power arrangement as from the object side, the distance between the second and third lens units increasing in zooming from wide-angle end to telephoto end.

The specification of U.S. Pat. No. 5,434,710 discloses a zoom lens consisting of three lens units in a negative-positive-positive optical power arrangement as from the object side, the distance between the second and third lens units decreasing in zooming from wide-angle end to telephoto end.

Japanese Patent Application Laid-open No. 3-288113 (corresponding to U.S. Pat. No. 5,270,863) discloses an optical system consisting of a zoom lens comprising three lens units in a negative-positive-positive optical power arrangement, in which the first lens unit of negative optical power is stationary, and the second and third lens units of positive optical power are moved to effect power variation.

Japanese Patent Application Laid-open No. 2000-147381 (corresponding to U.S. Pat. No. 6,243,213B), Japanese Patent Application Laid-open No. 2000-137164, and U.S. Pat. No. 4,465,343 disclose a zoom lens comprising three lens units in a negative-positive-positive optical power arrangement, focusing being effected with the second unit.

Japanese Patent Application Laid-open No. 2000-111798 (corresponding to U.S. Pat. No. 6,308,011B) discloses a zoom lens consisting of three lens units in a negative-positive-positive optical power arrangement as from the object side. In this zoom lens, a lens back of the requisite length for insertion of a filter or the like ensured on the image plane side, and the requisite telecentric characteristics for a solid-state image sensor are provided at the same time, in which the total length is reduced as much as possible while maintaining a variable power ratio of 2 or more to provide a compact zoom lens.

Japanese Patent Application Laid-open No. 60-31110 (corresponding to U.S. Pat. No. 4,687,302) discloses a zoom lens consisting of four lens units in a negative-positive-positive-positive optical power arrangement as from the object side, in which the distance between the second and third lens units decreases in zooming from wide-angle to telephoto end, with the fourth lens unit being stationary during zooming.

Japanese Patent Publication No. 4-14764 (corresponding to U.S. Pat. No. 4,687,302) discloses a zoom lens consisting of four lens units in a negative-positive-positive-positive optical power arrangement, in which focusing is effected with the third lens unit.

Nowadays, a solid-state image sensor has a large number of pixels, and there is a tendency for the pixel size in a particular image size to be rather small. As a result, there is a demand for a photographic lens having a higher optical performance as compared with the conventional ones of the same image size.

Further, there is a demand for a zoom lens in which the requisite lens back for insertion of a filter or the like is secured behind the lens system and, at the same time, the requisite telecentric characteristics for reducing shading for a solid-state image sensor are achieved, reducing the total lens length to provide a compact zoom lens of high variable power ratio.

For example, in the three-lens-unit zoom lens disclosed in Japanese Patent Application Laid-open No. 2000-147381, Japanese Patent Application Laid-open No. 2000-137164, and U.S. Pat. No. 4,465,343, there is no positive lens unit arranged in the entire zoom range in the vicinity of the image plane, so that it is difficult to secure a sufficiently long exit pupil to provide telecentric characteristics. To secure a sufficiently long exit pupil, it is necessary to relax the power of the first unit, with the result that the total lens length at the wide-angle end is rather large.

In the zoom lens disclosed in Japanese Patent Application Laid-open No. 60-31110, the number of lenses is large, so that the lens system as a whole tends to be rather large.

In the zoom lens disclosed in Japanese Patent Application Laid-open No. 4-14764, the air distance between the second and third lens units at the wide-angle end is small, so that it is difficult to secure a sufficiently long exit pupil in the wide-angle range.

SUMMARY OF THE INVENTION

An object of the present invention is to provide a novel compact zoom lens that consists of few lenses and has an excellent optical performance with taking into account the above-mentioned conventional art.

In order to attain the above-mentioned object, a zoom lens according to a first aspect of the present invention is characterized by comprising:

a first lens unit of a negative optical power;

a second lens unit of a positive optical power, the second lens unit consisting of a first lens sub unit of a positive optical power arranged on an object side and a second lens sub unit of a positive optical power arranged on an image side with respect to a maximum gap in the unit; and a third lens unit of a positive optical power, the first through third lens units being arranged in that order from the object side to the image side, in which zooming is effected by moving the lens units such that the distance between the first lens unit and the second lens unit is smaller at a telephoto end than at a wide-angle end and that the distance between the second lens unit and the third lens unit is larger at the telephoto end than at the wide-angle end, focusing is effected by moving the second lens sub unit or the third lens unit, and when focusing is effected on an object at infinity at the wide-angle end, assuming that the distance between the first lens sub unit and the second lens sub unit is d2abw and that the focal length of the entire system at the wide-angle end is fw, the following condition is satisfied:

$$0.2 < d2abw/fw < 1.0.$$

Also, a zoom lens according to another aspect of the present invention is characterized by comprising:

a first lens unit of a negative optical power;

a second lens unit of a positive optical power, the second lens unit consisting of a first lens sub unit of a positive optical power arranged on an object side and a second lens sub unit of a positive optical power arranged on an image side with respect to a maximum gap in the unit; and a third lens unit of a positive optical power, the first through third lens units being arranged in that order from the object side to the image side, in which zooming is effected by moving the lens units such that the distance between the first lens unit and the second lens unit is smaller at a telephoto end than at a wide-angle end and that the distance between the second lens unit and the third lens unit is larger at the telephoto end than at the wide-angle end, focusing is effected by moving the second lens sub unit, a beam emitted from the first lens sub unit at the telephoto end is substantially afocal, and assuming that the image formation magnification of the second lens sub unit when focusing is effected on an object at infinity at the telephoto end is β2bt, the following condition is satisfied:

$$-0.30 < \beta 2bt < 0.55.$$

BRIEF DESCRIPTION OF THE DRAWINGS

FIG. 10 is a diagram showing the aberration at the wide-angle end of the zoom lens of Numerical Embodiment 3;

FIG. 11 is a diagram showing the aberration at the intermediate zoom position of the zoom lens of Numerical Embodiment 3;

FIG. 12 is a diagram showing the aberration at the telephoto end of the zoom lens of Numerical Embodiment 3;

FIG. 18 is a diagram showing the aberration at the wide-angle end of the zoom lens of Numerical Embodiment 5;

FIG. 19 is a diagram showing the aberration at the intermediate zoom position of the zoom lens of Numerical Embodiment 5;

FIG. 20 is a diagram showing the aberration at the telephoto end of the zoom lens of Numerical Embodiment 5;

FIG. 22 is a diagram showing the aberration at the wide-angle end of the zoom lens of Numerical Embodiment 6;

FIG. 23 is a diagram showing the aberration at the intermediate zoom position of the zoom lens of Numerical Embodiment 6;

FIG. 24 is a diagram showing the aberration at the telephoto end of the zoom lens of Numerical Embodiment 6;

DESCRIPTION OF THE PREFERRED EMBODIMENTS

In the following, embodiments of the zoom lens of the present invention and an optical apparatus using the same will be described with reference to the drawings.

First Embodiment

Figure 1A:
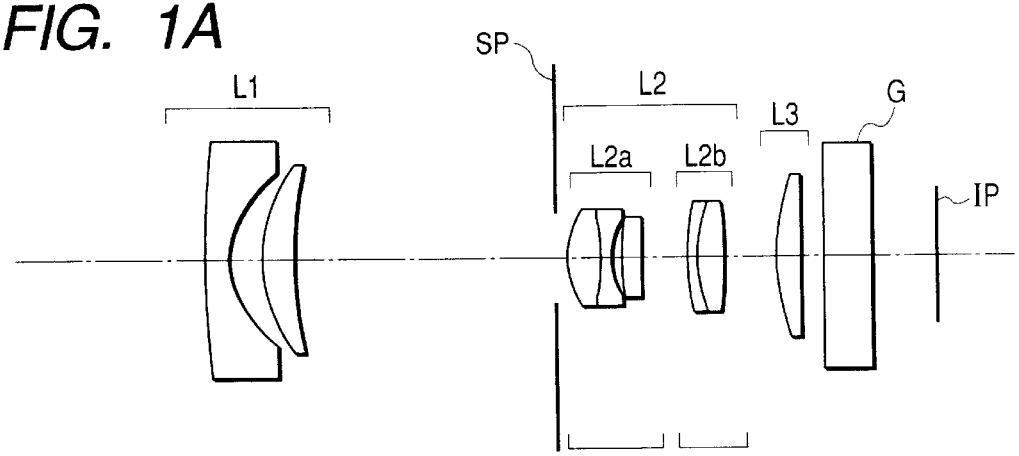
FIGS. 1A, 1B, and 1C are sectional views of a zoom lens in accordance with Numerical Embodiment 1.
Figure 1B:
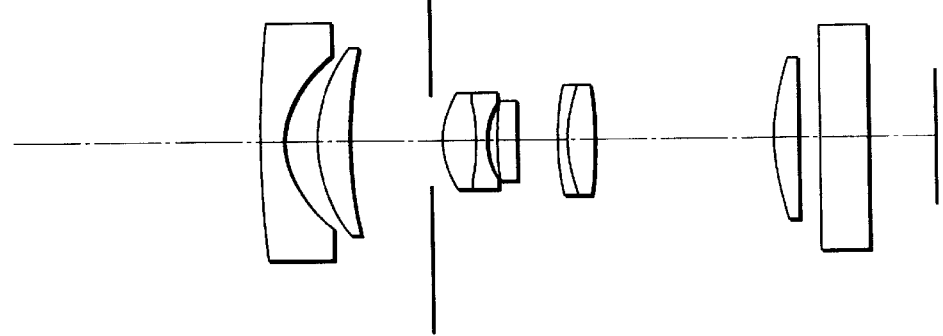
Figure 1C:
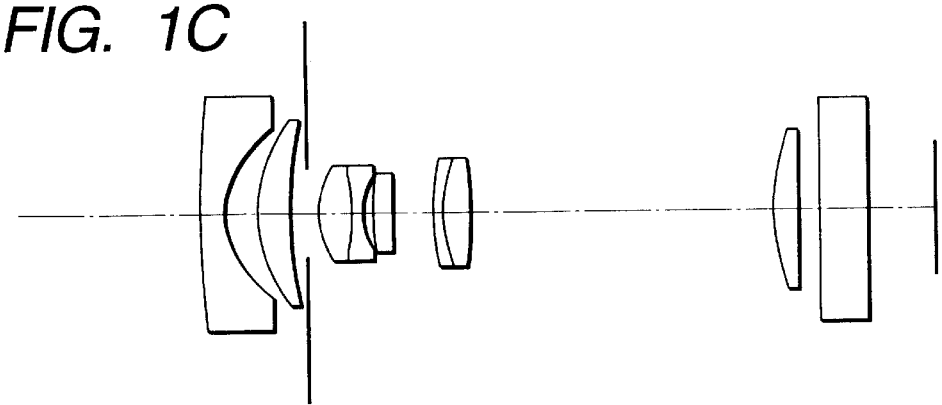
Figure 2:
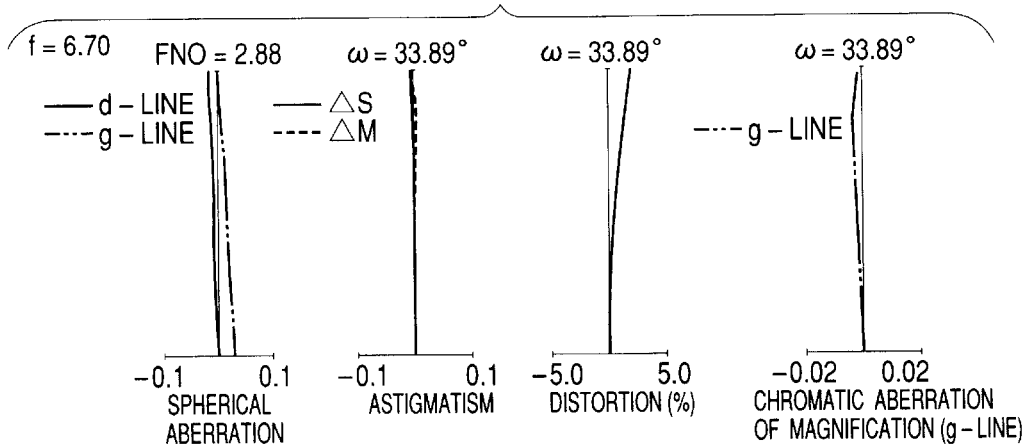
FIG. 2 is a diagram showing the aberration at the wide-angle end of the zoom lens of Numerical Embodiment 1.
Figure 3:
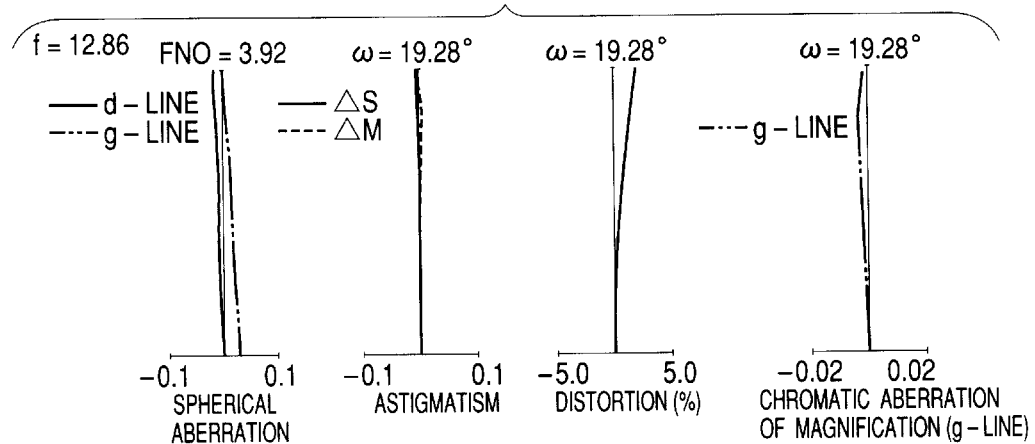
FIG. 3 is a diagram showing the aberration at the intermediate zoom position of the zoom lens of Numerical Embodiment 1.
Figure 4:
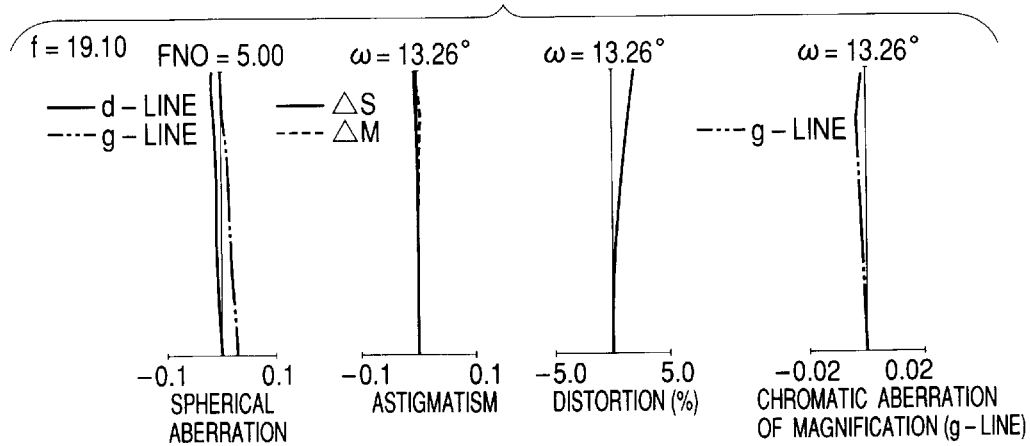
FIG. 4 is a diagram showing the aberration at the telephoto end of the zoom lens of Numerical Embodiment 1.

FIGS. 1A, 1B, and 1C are sectional views of a zoom lens in accordance with Numerical Embodiment 1 described below. FIGS. 2 through 4 are diagrams respectively showing the aberration at the wide-angle end, the intermediate zoom position, and the telephoto end of the zoom lens of Numerical Embodiment 1.

Figure 5A:
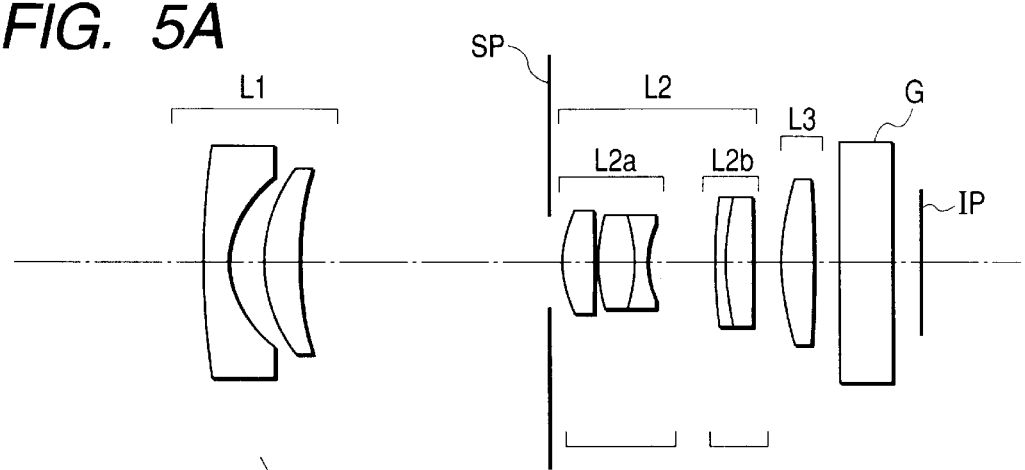
FIGS. 5A, 5B, and 5C are sectional views of a zoom lens in accordance with Numerical Embodiment 2.
Figure 5B:
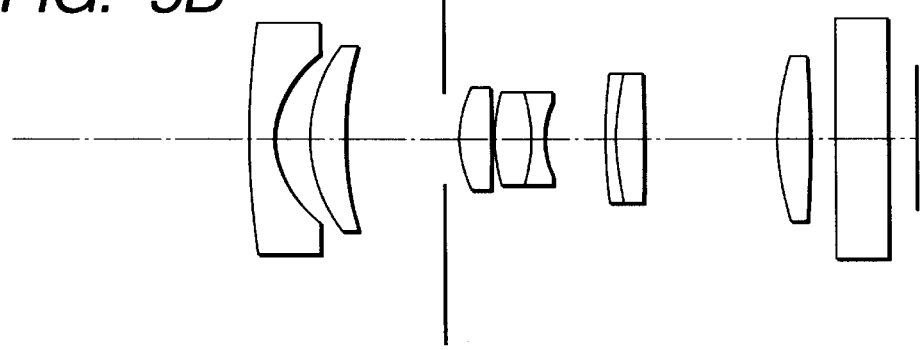
Figure 5C:
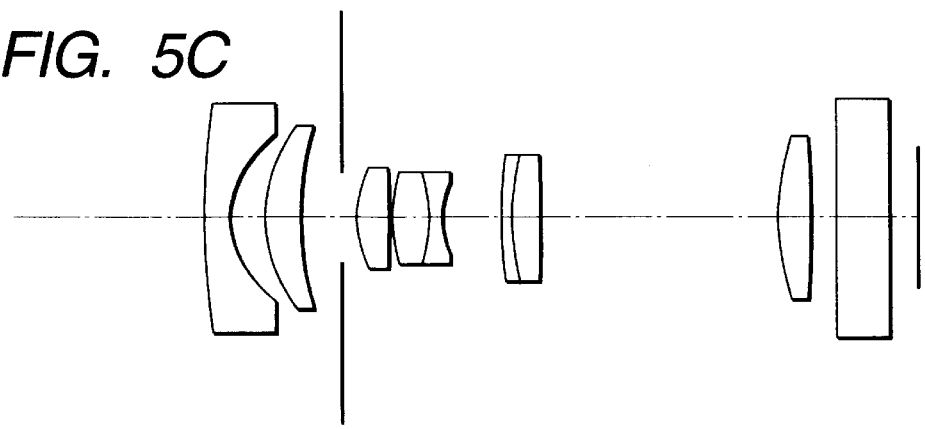
Figure 6:
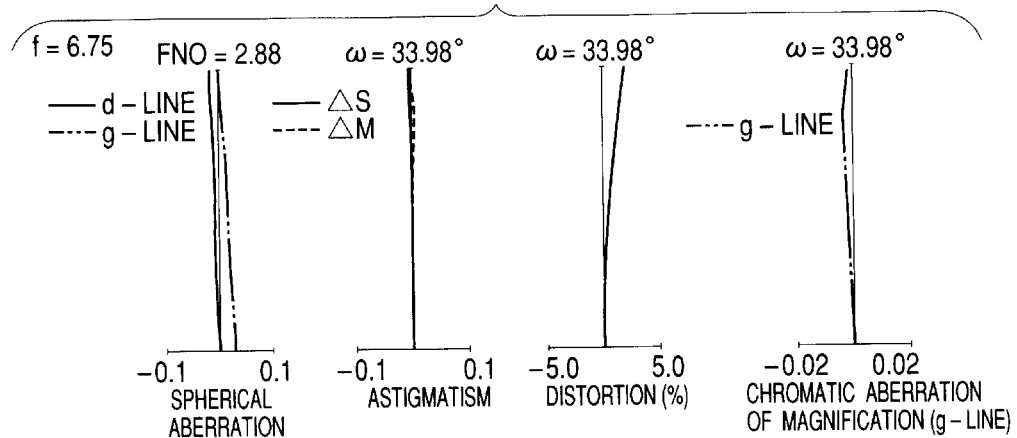
FIG. 6 is a diagram showing the aberration at the wide-angle end of the zoom lens of Numerical Embodiment 2.
Figure 7:
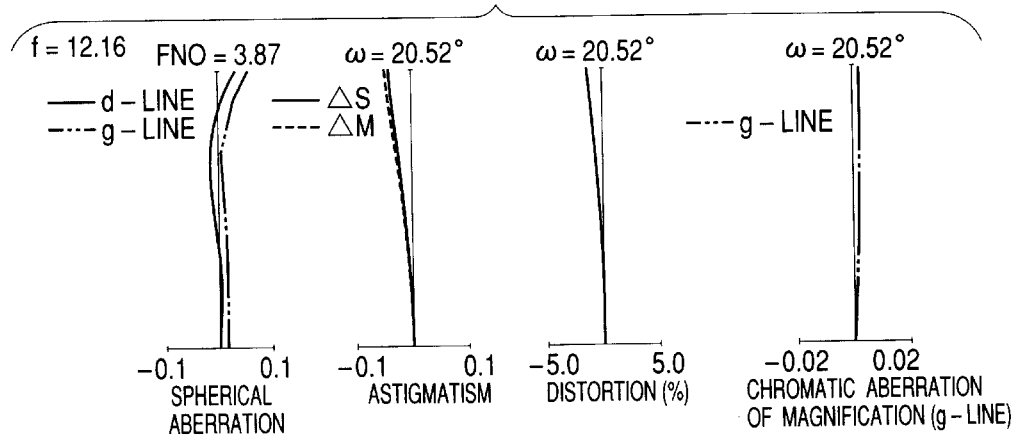
FIG. 7 is a diagram showing the aberration at the intermediate zoom position of the zoom lens of Numerical Embodiment 2.
Figure 8:
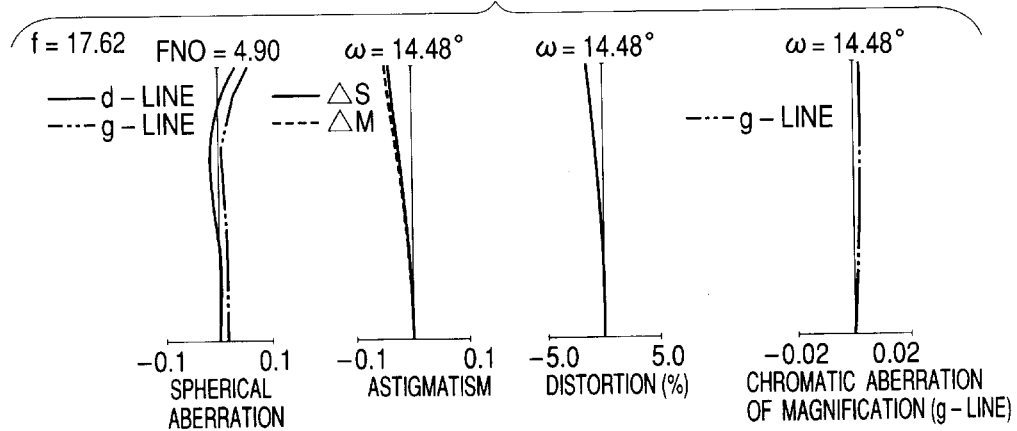
FIG. 8 is a diagram showing the aberration at the telephoto end of the zoom lens of Numerical Embodiment 2.

FIGS. 5A, 5B, and 5C are sectional views of a zoom lens in accordance with Numerical Embodiment 2 described below. FIGS. 6 through 8 are diagrams respectively showing the aberration at the wide-angle end, the intermediate zoom position, and the telephoto end of the zoom lens of Numerical Embodiment 2.

Figure 9A:
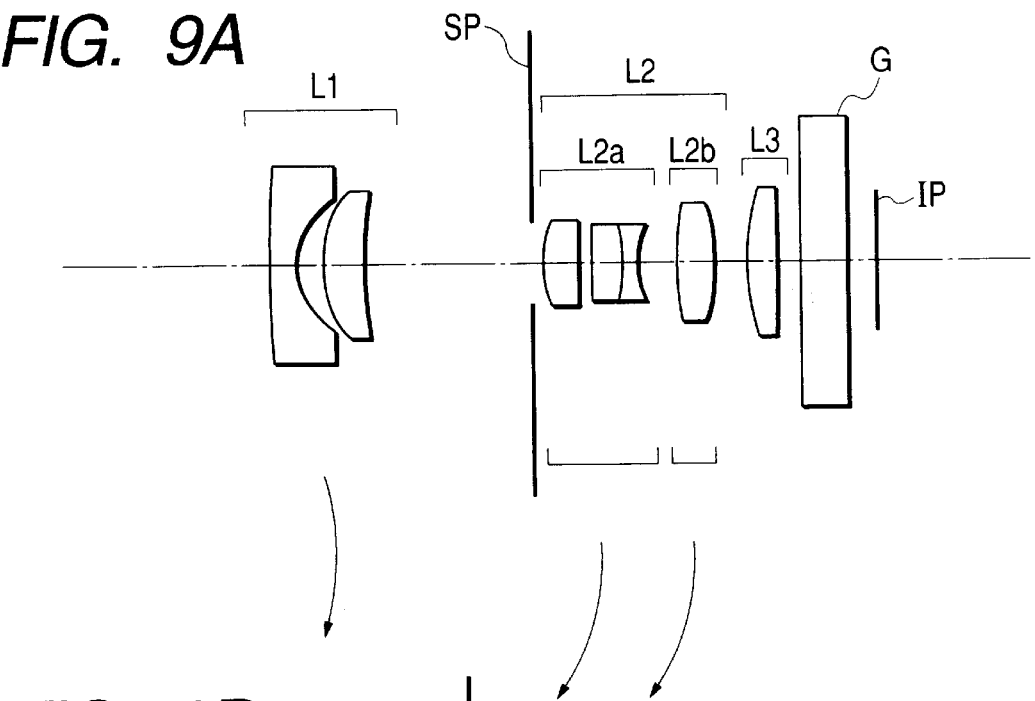
FIGS. 9A, 9B, and 9C are sectional views of a zoom lens in accordance with Numerical Embodiment 3.
Figure 9B:
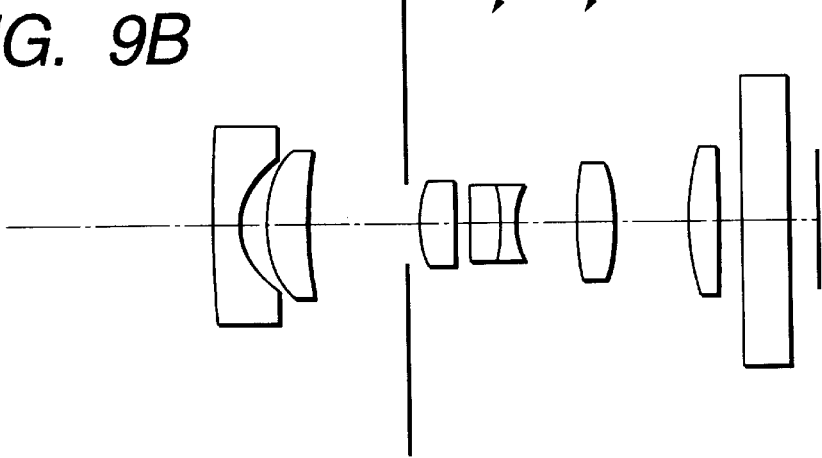
Figure 9C:
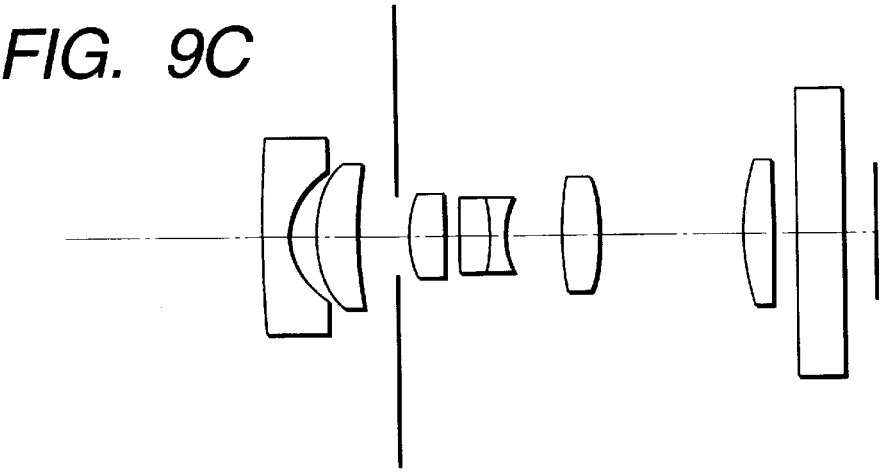

FIGS. 9A, 9B, and 9C are sectional views of a zoom lens in accordance with Numerical Embodiment 3 described below. FIGS. 10 through 12 are diagrams respectively showing the aberration at the wide-angle end, the intermediate zoom position, and the telephoto end of the zoom lens of Numerical Embodiment 3.

Figure 13A:
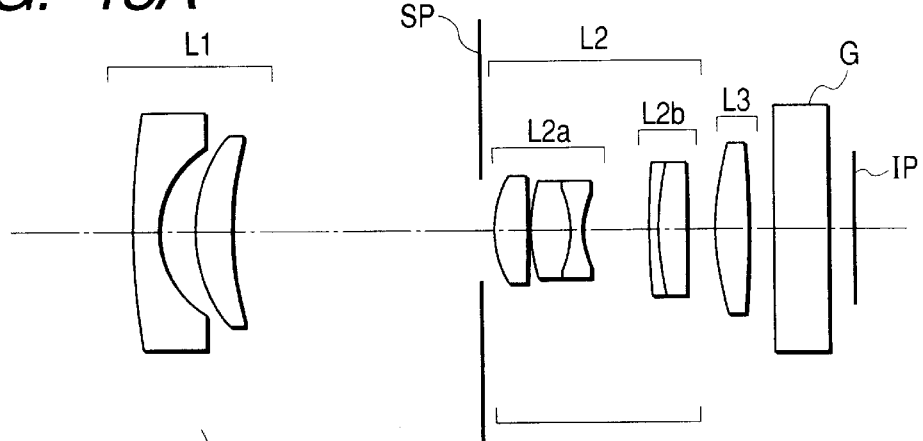
FIGS. 13A, 13B, and 13C are sectional views of a zoom lens in accordance with Numerical Embodiment 4.
Figure 13B:
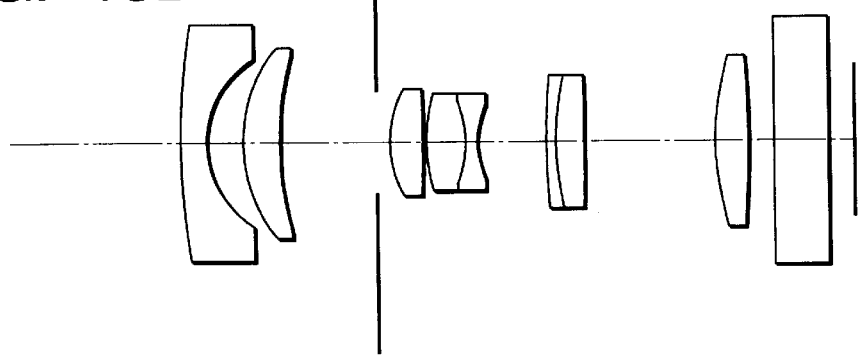
Figure 13C:
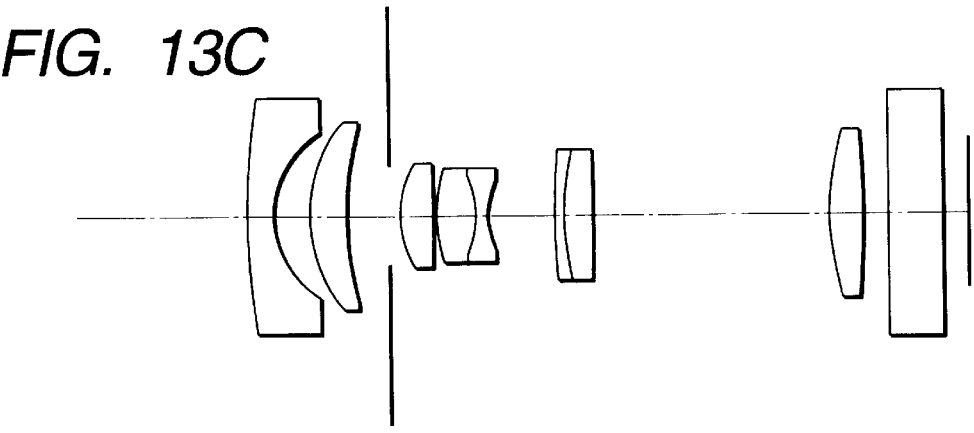
Figure 14:
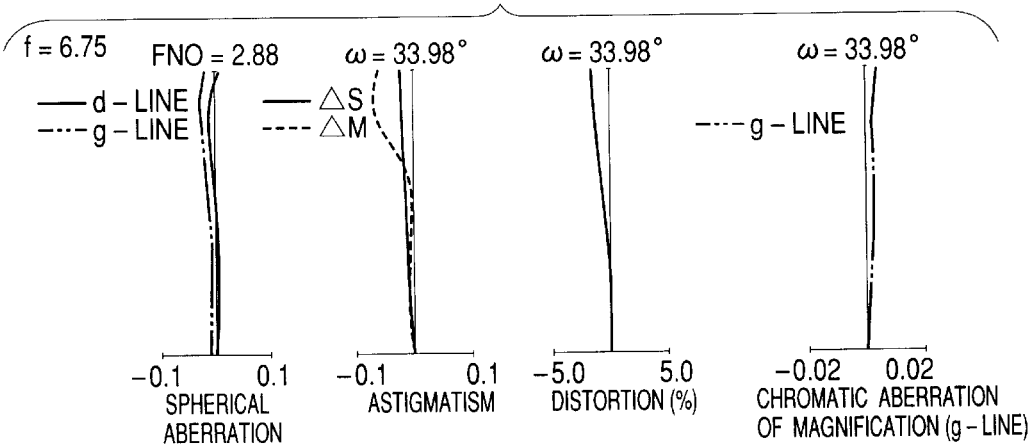
FIG. 14 is a diagram showing the aberration at the wide-angle end of the zoom lens of Numerical Embodiment 4.
Figure 15:
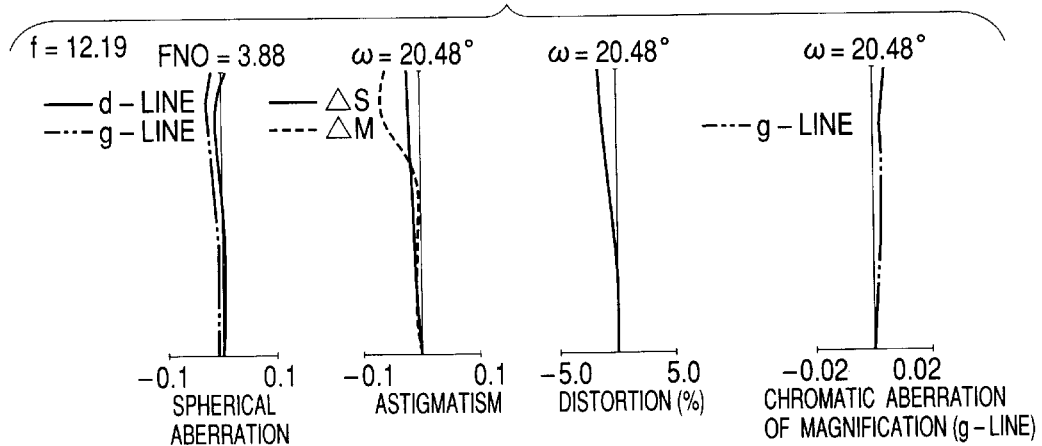
FIG. 15 is a diagram showing the aberration at the intermediate zoom position of the zoom lens of Numerical Embodiment 4.
Figure 16:
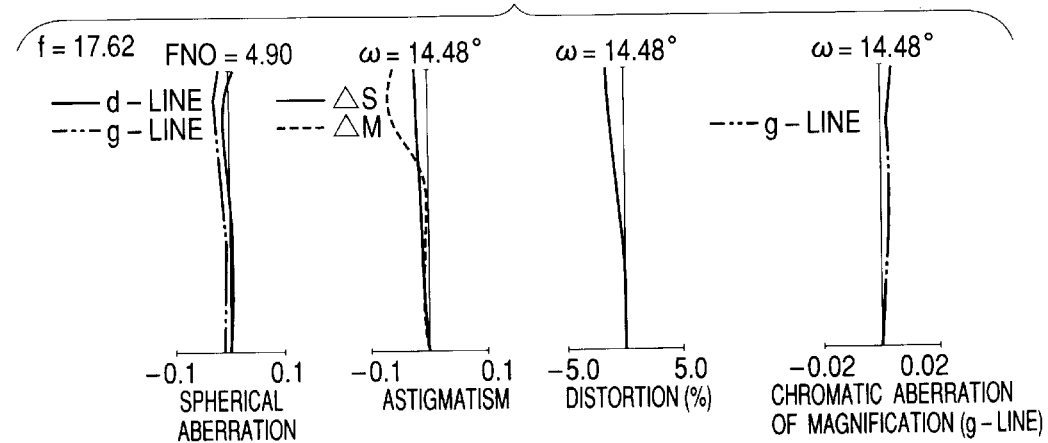
FIG. 16 is a diagram showing the aberration at the telephoto end of the zoom lens of Numerical Embodiment 4.

FIGS. 13A, 13B, and 13C are sectional views of a zoom lens in accordance with Numerical Embodiment 4 described below. FIGS. 14 through 16 are diagrams respectively showing the aberration at the wide-angle end, the intermediate zoom position, and the telephoto end of the zoom lens of Numerical Embodiment 4.

In the sectional views of the respective zoom lenses of Numerical Embodiments, shown in FIGS. 1, 5, 9, and 13, symbol L1 indicates a first lens unit of negative optical power (optical power is a reciprocal of the focal length), symbol L2 indicates a second lens unit of positive optical power, symbol L3 indicates a third lens unit of positive optical power, symbol SP indicates an aperture diaphragm (stop), and symbol IP indicates an image plane, where a solid-state image sensor, such as CCD or CMOS, is arranged. Symbol G indicates a glass block corresponding to a filter, a color separation prism or the like.

The second lens unit L2 is composed of a first lens sub unit L2$a$ of positive optical power and a second lens sub unit L2$b$ of positive optical power, which are spaced apart from each other by an air gap largest in the second lens unit L2, the second lens sub unit L2$b$ being moved in the optical axis direction to effect focusing from an object at infinity to an object at a finite distance.

The zoom lens of Embodiment 1 has a first lens unit L1 of negative optical power, a second lens unit L2 of positive optical power, and a third lens unit L3 of positive optical power arranged in that order from the object side, and the lens units are moved such that the distance between the first lens unit L1 and the second lens unit L2 is smaller and the distance between the second lens unit L2 and the third lens unit L3 is larger at the telephoto end than at the wide-angle end to thereby effect zooming. Then, assuming that the distance between the first lens sub unit L2$a$ and the second lens sub unit L2$b$ when focusing is attained on an object at infinity at the wide-angle end is d2$abw$, and that the focal length of the entire system at the wide-angle end is fw, the following condition is satisfied:

$$0.2 < d2abw/fw < 1.0 \quad (1)$$

Further, assuming that the beam emitted from the first lens sub unit L2$a$ at the telephoto end is substantially afocal, and that the image formation magnification of the second lens sub unit L2$b$ when focusing is attained on an object at infinity at the telephoto end is β2$bt$, the following condition is satisfied:

$$-0.30 < \beta 2bt < 0.55 \quad (2)$$

When it is said that the beam is substantially afocal, it means that the combined focal length f12$a$ of the first lens unit L1 and the first lens sub unit L2$a$ is approximately of a magnitude satisfying the following:

$$20 \times fw < |f12a|$$

In the zoom lens of Embodiment 1, main power variation is effected by moving the second lens unit L2 of positive optical power, and displacement of the image point due to the power variation is corrected by substantially reciprocating the first lens unit L1 of negative optical power. The third lens unit L3 of positive optical power does not contribute to power variation when it is stationary during zooming. However, it shares the increase in optical power of the photographic lens as a result of the reduction in the size of an image sensor, and reduces the optical power of the short zoom system formed by the first and second lens units, whereby generation of aberration in each of the lenses constituting the first lens unit L1, in particular, is restrained, thereby achieving a satisfactory optical performance. Further, image-side telecentric image formation particularly required in a photographic apparatus using a solid-state image sensor or the like is achieved by causing the third lens unit L3 of positive optical power to function as a field lens.

Further, regarding focusing, a so-called inner focus system in which the small and light second lens sub unit L2$b$ is moved is adopted, whereby quick focusing can be easily achieved. Further, through appropriate setting of the lens construction, the fluctuation in aberration at the time of focusing is diminished.

Further, the third lens unit L3 is made stationary at the time of zooming and focusing, thereby simplifying the lens barrel structure.

While in all the numerical embodiments of the zoom lens of Embodiment 1 the third lens unit L3 is stationary during the zooming, it is also possible for the lens unit to be movable. This complicates the lens barrel construction, but makes it easy to further diminish fluctuation in aberration in zooming.

In Embodiment 1, the first and second lens sub units L2$a$ and L2$b$ are placed on the same cam, and the differential change in each object distance with respect to the first lens sub unit L2$a$ is driven by an actuator operationally connected with the second lens unit L2 during the zooming, thereby achieving simplification in mechanical structure.

Next, the meaning of the conditional expressions will be explained.

In conditional expression (1), the distance d2$abw$ between the first and second lens sub units L2$a$ and L2$b$ at the wide-angle end is standardized by the focal length fw at the wide-angle end. When the upper limit value of conditional expression (1) is exceeded, and the distance between the first and second lens sub units L2$a$ and L2$b$ becomes too large, the size of the driving mechanism for driving the second lens sub unit L2$b$ becomes disadvantageously large.

When the lower limit value of conditional expression (1) is exceeded, and the distance between the first and second lens sub units L2$a$ and L2$b$ becomes too small, the exit pupil position at the wide-angle end becomes too short, so that the influence of the shading becomes disadvantageously large.

More preferably, the numerical range of conditional expression (1) is set to be as follows:

$$0.3 < d2abw/fw < 0.7 \quad (1a)$$

Next, the technical meaning of conditional expression (2) will be explained.

In the zoom lens of Embodiment 1, focusing is effected by the second lens sub unit L2b of the second lens unit L2. It is necessary to simply set the mechanical construction and appropriately set the focus sensitivity of the second lens sub unit L2b at the telephoto end in order to restrain fluctuations in various aberrations due to focusing.

Assuming that the respective image formation magnifications of the second lens sub unit L2b and the third lens unit L3 at the telephoto end are β2bt and β3t, the focus sensitivity of the second lens sub unit L2b can be expressed as follows:

$$(1-\beta 2bt^2) \times \beta 3t^2.$$

To maintain an appropriate sensitivity, it is necessary that the beam emitted from the first lens sub unit L2a at the telephoto end be substantially afocal and that the image formation magnification of the second lens sub unit L2b when focusing is attained on an object at infinity be et to be sufficiently low.

Conditional expression (2) is based on the above requirement.

When the upper limit value of conditional expression (2) is exceeded, and the image formation magnification of the second lens sub unit L2b becomes too large, the focus sensitivity of the second lens sub unit L2b is deteriorated, and the focus let-out amount increases. Thus, when focusing is to be achieved on a near object in the telephoto area, the second and first lens sub units L2b and L2a interfere, so that it is difficult to shorten the close-up distance.

On the other hand, when the lower limit value of conditional expression (2) is exceeded, and the image formation magnification of the second lens sub unit L2b becomes too low, the beam emitted from the first lens sub unit L2a exhibits intense divergence, and the fluctuation in curvature of field due to focusing disadvantageously increases in the telephoto area.

More preferably, the numerical range of conditional expression (2) is set to be as follows:

$$-0.10 < \beta 2bt < 0.52 \quad (2a)$$

With the above-described construction, the zoom lens of this embodiment can achieve the initial object of the present invention. However, to obtain a high optical performance over the entire variable power range and the entire image plane, it is desirable that one or more of the following requirements be satisfied.

(A-1) Assuming that the respective distances between the first and second lens sub units L2a and L2b at the wide-angle end and the telephoto end when focusing is attained on an object at infinity are d2abw and d2abt, and the respective distances between the first and second lens sub units L2a and L2b at the wide-angle end and the telephoto end when focusing is attained on an object at distance of 500×fw are d2abw#of and d2abt#of, the following condition is satisfied:

$$(d2abt-d2abt\#of) > (d2abw-d2abw\#of) \quad (3)$$

Conditional expression (3) is used to appropriately set the lens distance between the first and second lens sub units L2a and L2b when the second lens sub unit L2b is let out at the time of focusing. When conditional expression (3) cannot be satisfied, the size of the lens system as a whole increases disadvantageously.

(A-2) When effecting zooming from the wide-angle end to the telephoto end, the distance between the first and second lens sub units L2a and L2b should vary.

By thus varying the distance between the first and second lens sub units L2a and L2b at the time of zooming from the wide-angle end to the telephoto end, it is possible to correct for the fluctuation in aberration due to power variation in a more satisfactory manner.

Further in Embodiment 1, the zoom lens is regarded as one composed of three lens units. However, when, as in the case of the zoom lenses of Numerical Embodiments 1, 2, and 3, the distance between the first and second lens sub units L2a and L2b varies during zooming, the zoom lens may be regarded as one composed of four lens units in a negative-positive-positive-positive optical power arrangement.

(A-3) There should be provided a diaphragm SP adapted to move integrally with the first lens sub unit L2a.

(A-4) The diaphragm SP should be arranged on the object side of the first lens sub unit L2a. The above (A-3) and (A-4) are conditions for achieving a reduction in the front lens diameter while performing aberration correction in a satisfactory manner.

(A-5) The first lens unit L1 should be formed solely by two lens elements of a negative lens element having an aspherical surface and a positive lens element. This makes it easy to reduce the thickness of the first lens unit to achieve a reduction in size while correcting for the distortion aberration in the wide-angle area.

(A-6) The first lens sub unit L2a should include at least one cemented lens formed by cementing together a positive lens element and a negative lens element. Positive and negative lenses, which are required in correcting for axial chromatic aberration, are highly sensitive, so that it is desirable to cement them together in order to prevent a deterioration in performance during production.

(A-7) The first lens sub unit L2a should include at least two positive lens elements. This makes it possible to forwardly displace the principal points in the first lens sub unit, whereby it is possible to prevent physical interference with the first lens unit in the telephoto area.

(A-8) The second lens sub unit L2b should be formed solely by a unitary lens component consisting of a single lens element or a cemented lens. By minimizing the lens construction of the second lens sub unit, it becomes easy to achieve a reduction in the size of the entire system.

(A-9) The third lens unit L3 should be formed by a single lens element. By minimizing the third lens unit, it is possible to prevent interference with the second lens sub unit at the wide-angle end and to achieve a reduction in size.

(A-10) The third lens unit L3 should be stationary during zooming. This makes it possible to form the lens barrel in a mechanically simple construction.

Next, the lens construction of the zoom lenses of Numerical Embodiments 1 through 4 will be described specifically.

In Numerical Embodiments 1 through 4, the first lens unit L1 is composed of two lenses: a negative meniscus lens arranged on the object side, exhibiting a convex surface on the object side and an aspherical surface on the image side; and a positive meniscus lens exhibiting a convex surface on the object side.

In Numerical Embodiment 1, the first lens sub unit L2a is composed of three lenses which are a positive lens and a cemented lens which has a positive optical power as a whole and which is constituted by cementing a positive lens having convex surfaces on both sides and a negative lens having concave surfaces on both sides.

In Numerical Embodiments 2 through 4, the first lens sub unit L2a is composed of three lenses: a positive lens whose curvature is larger (i.e., whose radius of curvature is smaller) on the object side than on the image side and whose both sides constitute convex surfaces; and cemented lenses formed by cementing together a positive lens whose both sides constitute convex surfaces and a negative lens whose both sides constitute concave surfaces and which has negative optical power as a whole.

In Numerical Embodiments 1 through 4, there is provided a diaphragm SP on the object side of the second lens unit L2, the diaphragm SP moving integrally with the second lens unit L2 during zooming.

In Numerical Embodiments 1 through 4, an aspherical surface is provided on the object side of the positive lens on the object side of the cemented lens in the first lens sub unit L2a.

In Numerical Embodiments 1, 2, and 4, the second lens sub unit L2b consists of a cemented lens formed by cementing together a negative lens having a convex surface on the object side and a positive lens having convex surfaces on both sides thereof.

In Numerical Embodiment 3, the second lens sub unit L2b consists of a single positive lens whose both sides are convex surfaces.

In Numerical Embodiments 1 through 4, the third lens unit L3 consists of a single positive lens.

In Numerical Embodiment 3, the positive lens of the third lens unit L3 has an aspherical surface on the object side.

In zooming, in Numerical Embodiments 1 through 4, the first lens unit L1 moves in a reciprocative type movement locus, the positions of the first lens unit L1 at the wide-angle end and the telephoto end being substantially the same, movement in a locus convex on the image side being effected in the intermediate area.

In Numerical Embodiments 1 through 4, the first and second lens sub units L2a and L2b move toward the object side during zooming. In Numerical Embodiments 1 and 2, the distance between the first and second lens sub units L2a and L2b decreases during zooming from the wide-angle end to the telephoto end. In Numerical Embodiment 3, the distance between the first and second lens sub units L2a and L2b first increases during zooming from the wide-angle end to the telephoto end, and then decreases, the distance being somewhat larger at the telephoto end than at the wide-angle end. In Numerical Embodiment 4, the distance between the first and second lens sub units L2a and L2b does not change during zooming from the wide-angle end to the telephoto end.

In the following, data on Numerical Embodiments 1 through 4 is shown. In these numerical embodiments, symbol i indicates the ordinal rank of the surface as from the object side, symbol Ri indicates the radius of curvature of each surface, symbol Di indicates the member thickness or air distance between the i-th and the (i+1)-th surfaces, and Ni and νi respectively indicate the refractive index with respect to d-line and Abbe constant. The two surfaces nearest to the image side constitute a glass block G corresponding to a crystal low-pass filter, an infrared cut filter or the like. Assuming that the displacement in the optical axis direction at a height H as measured from the optical axis is x, with the surface vertex serving as a reference, the aspherical configuration can be expressed as follows:

$$X = \frac{(1/R)H^2}{1+\sqrt{1-(1+K)(H/R)^2}} + AH^2 + BH^4 + CH^6 + DH^8 + EH^{10} \quad \text{[Equation 1]}$$

where R is a radius of curvature, K is a conical constant, and A, B, C, D, and E are aspherical coefficients.

Further, [e−X] means [×10$^{-x}$].

Table 1 shows the relationship between the above conditional expressions and the various values in Numerical Embodiments 1 through 4.

| Numerical Embodiment 1 f = 6.70~19.10 Fno = 2.88~5.00 2ω = 68.4~26.8 | | | |
|---|---|---|---|
| R1 = 95.655 | D1 = 1.50 | N 1 = 1.802380 | ν 1 = 40.8 |
| R2 = 5.705 | D2 = 2.18 | | |
| R3 = 10.647 | D3 = 2.05 | N 2 = 1.846659 | ν 2 = 23.8 |
| R4 = 31.989 | D4 = variable | | |
| R5 = diaphragm | D5 = 0.80 | | |
| R6 = 6.035 | D6 = 2.24 | N 3 = 1.743300 | ν 3 = 49.2 |
| R7 = −14.355 | D7 = 0.70 | N 4 = 1.674788 | ν 4 = 34.4 |
| R8 = 5.311 | D8 = 0.68 | | |
| R9 = 24.734 | D9 = 1.20 | N 5 = 1.847000 | ν 5 = 23.8 |
| R10 = −6224.560 | D10 = variable | | |
| R11 = 19.837 | D11 = 0.60 | N 6 = 1.846659 | ν 6 = 23.8 |
| R12 = 9.564 | D12 = 1.80 | N 7 = 1.487490 | ν 7 = 70.2 |
| R13 = −23.098 | D13 = variable | | |
| R14 = 16.000 | D14 = 1.65 | N 8 = 1.487000 | ν 8 = 70.4 |
| R15 = −383.541 | D15 = 1.50 | | |
| R16 = ∞ | D16 = 3.10 | N 9 = 1.516330 | ν 9 = 64.2 |
| R17 = ∞ | | | |

| Variable | Focal Length | | |
|---|---|---|---|
| Interval | 6.70 | 12.86 | 19.10 |
| D4 | 17.15 | 5.30 | 1.12 |
| D10 | 3.05 | 2.77 | 2.50 |
| D13 | 3.44 | 11.72 | 19.99 |

-continued

Aspherical Coefficient

| Second Surface: | k = 1.30000e+00 | A = 0 | B = 3.91358e-04 | C = 2.47171e-07 | D = -3.57102e-08 | E = 4.67101e-10 |
| --- | --- | --- | --- | --- | --- | --- |
| Sixth Surface: | k = 6.85202e-03 | A = 0 | B = -2.83480e-04 | C = 3.56671e-06 | D = -1.22280e-06 | E = 4.61961e-08 |

Numerical Embodiment 2
f = 6.75~17.62  Fno = 2.88~4.90  2ω = 68.0~29.0

| R1 = 48.560 | D1 = 1.50 | N 1 = 1.802380 | ν 1 = 40.8 |
| --- | --- | --- | --- |
| R2 = 5.255 | D2 = 2.20 | | |
| R3 = 9.202 | D3 = 2.14 | N 2 = 1.846659 | ν 2 = 23.8 |
| R4 = 20.208 | D4 = variable | | |
| R5 = diaphragm | D5 = 0.80 | | |
| R6 = 6.781 | D6 = 2.00 | N 3 = 1.603112 | ν 3 = 60.7 |
| R7 = -42096 | D7 = 0.20 | | |
| R8 = 10.553 | D8 = 2.31 | N 4 = 1.740130 | ν 4 = 49.2 |
| R9 = -7.122 | D9 = 0.70 | N 5 = 1.749497 | ν 5 = 35.3 |
| R10 = 4.926 | D10 = variable | | |
| R11 = 41.969 | D11 = 0.60 | N 6 = 1.698947 | ν 6 = 30.1 |
| R12 = 16.946 | D12 = 1.74 | N 7 = 1.696797 | ν 7 = 55.5 |
| R13 = -68.041 | D13 = variable | | |
| R14 = 18.000 | D14 = 2.00 | N 8 = 1.487490 | ν 8 = 70.2 |
| R15 = -54.148 | D15 = 1.50 | | |
| R16 = ∞ | D16 = 3.23 | N 9 = 1.516330 | ν 9 = 64.2 |
| R17 = ∞ | | | |

| Variable | Focal Length | | |
| --- | --- | --- | --- |
| Interval | 6.75 | 12.16 | 17.62 |
| D4 | 15.16 | 5.98 | 2.46 |
| D10 | 4.09 | 3.80 | 3.55 |
| D13 | 1.62 | 8.02 | 14.39 |

Aspherical Coefficient

| Second Surface: | k = -1.0667e+00 | A = 0 | B = 4.30431e-04 | C = 1.54471e-06 | D = 5.01190e-08 | E = -9.58836e-10 |
| --- | --- | --- | --- | --- | --- | --- |
| Eighth Surface: | k = 1.19778e+00 | A = 0 | B = -5.93304e-04 | C = 8.60711e-06 | D = -1.23239e-06 | E = 4.79022e-08 |

Numerical Embodiment 3
f = 4.49~8.61  Fno = 2.88~4.02  2ω = 73.5~42.5

| R1 = 80.453 | D1 = 1.30 | N 1 = 1.802380 | ν 1 = 40.8 |
| --- | --- | --- | --- |
| R2 = 3.144 | D2 = 1.39 | | |
| R3 = 6.364 | D3 = 2.00 | N 2 = 1.846659 | ν 2 = 23.8 |
| R4 = 22.763 | D4 = variable | | |
| R5 = diaphragm | D5 = 0.59 | | |
| R6 = 5.387 | D6 = 1.84 | N 3 = 1.696797 | ν 3 = 55.5 |
| R7 = -24.511 | D7 = 0.59 | | |
| R8 = 42.292 | D8 = 1.64 | N 4 = 1.743300 | ν 4 = 49.2 |
| R9 = -5.476 | D9 = 0.66 | N 5 = 1.698947 | ν 5 = 30.1 |
| R10 = 4.702 | D10 = variable | | |
| R11 = 16.441 | D11 = 1.94 | N 6 = 1.487490 | ν 6 = 70.2 |
| R12 = -10.475 | D12 = variable | | |
| R13 = 13.248 | D13 = 1.50 | N 7 = 1.487490 | ν 7 = 70.2 |
| R14 = -89.455 | D14 = 1.10 | | |
| R15 = ∞ | D15 = 2.30 | N 8 = 1.516330 | ν 8 = 64.2 |
| R16 = ∞ | | | |

| Variable | Focal Length | | |
| --- | --- | --- | --- |
| Interval | 6.70 | 12.86 | 19.10 |
| D4 | 8.32 | 4.96 | 1.98 |
| D10 | 1.99 | 3.18 | 2.84 |
| D12 | 1.53 | 3.57 | 7.08 |

-continued

Aspherical Coefficient

| Second Surface: | $k = -1.26671e+00$ | $A = 0$ | $B = 1.98495e-03$ | $C = 1.78263e-05$ | $D = -3.89544e-06$ | $E = 1.54685e-07$ |
|---|---|---|---|---|---|---|
| Eighth Surface: | $k = 6.85202e-03$ | $A = 0$ | $B = -1.94477e-03$ | $C = 3.27632e-05$ | $D = -3.11268e-05$ | $E = 3.51825e-06$ |
| 13th Surface: | $k = 0.00000e+00$ | $A = 0$ | $B = 3.36681e-05$ | $C = 8.26694e-06$ | $D = -1.04884e-06$ | $E = 3.52403e-08$ |

Numerical Embodiment 4
$f = 6.75 \sim 17.62$ Fno $= 2.88 \sim 4.90$ $2\omega = 68.0 \sim 29.0$

| R1 = 48.471 | D1 = 1.50 | N 1 = 1.802380 | ν 1 = 40.8 |
|---|---|---|---|
| R2 = 5.270 | D2 = 2.21 | | |
| R3 = 9.214 | D3 = 2.14 | N 2 = 1.846659 | ν 2 = 23.8 |
| R4 = 20.234 | D4 = variable | | |
| R5 = diaphragm | D5 = 0.80 | | |
| R6 = 6.788 | D6 = 2.00 | N 3 = 1.603112 | ν 3 = 60.7 |
| R7 = −40.782 | D7 = 0.20 | | |
| R8 = 10.555 | D8 = 2.32 | N 4 = 1.740130 | ν 4 = 49.2 |
| R9 = −6.963 | D9 = 0.70 | N 5 = 1.719197 | ν 5 = 35.3 |
| R10 = 4.919 | D10 = 4.10 | | |
| R11 = 41.659 | D11 = 0.60 | N 6 = 1.698947 | ν 6 = 30.1 |
| R12 = 17.413 | D12 = 1.75 | N 7 = 1.696797 | ν 7 = 55.5 |
| R13 = −70.421 | D13 = variable | | |
| R14 = 18.000 | D14 = 2.00 | N 8 = 1.487490 | ν 8 = 70.2 |
| R15 = −54.405 | D15 = 1.50 | | |
| R16 = ∞ | D15 = 3.23 | N 9 = 1.516330 | ν 9 = 64.2 |
| R17 = ∞ | | | |

| Variable | Focal Length | | |
|---|---|---|---|
| Interval | 6.75 | 12.19 | 17.62 |
| D4 | 15.22 | 6.00 | 2.46 |
| D13 | 1.66 | 7.85 | 14.04 |

Aspherical Coefficient

| Second Surface: | $k = 1.04670e+00$ | $A = 0$ | $B = 4.09984e-04$ | $C = 1.40934e-06$ | $D = 7.47026e-08$ | $E = -1.55583e-09$ |
|---|---|---|---|---|---|---|
| Eighth Surface: | $k = 1.08413e+00$ | $A = 0$ | $B = -6.00015e-04$ | $C = -8.91980e-06$ | $D = -1.20969e-06$ | $E = 4.79022e-08$ |

TABLE 1

| | | Numerical Embodiment | | | |
|---|---|---|---|---|---|
| | Conditional expression | 1 | 2 | 3 | 4 |
| (1) | d2abw/fw | 0.46 | 0.60 | 0.44 | 0.61 |
| (2) | β 2bt | 0.13 | 0.37 | −0.04 | 0.51 |
| (3) | d2abt − d2abt#fo | 0.04 | 0.04 | 0.02 | 0.05 |
| | d2abw − d2abw#fo | 0.11 | 0.17 | 0.05 | 0.20 |

Second Embodiment

Figure 17A:
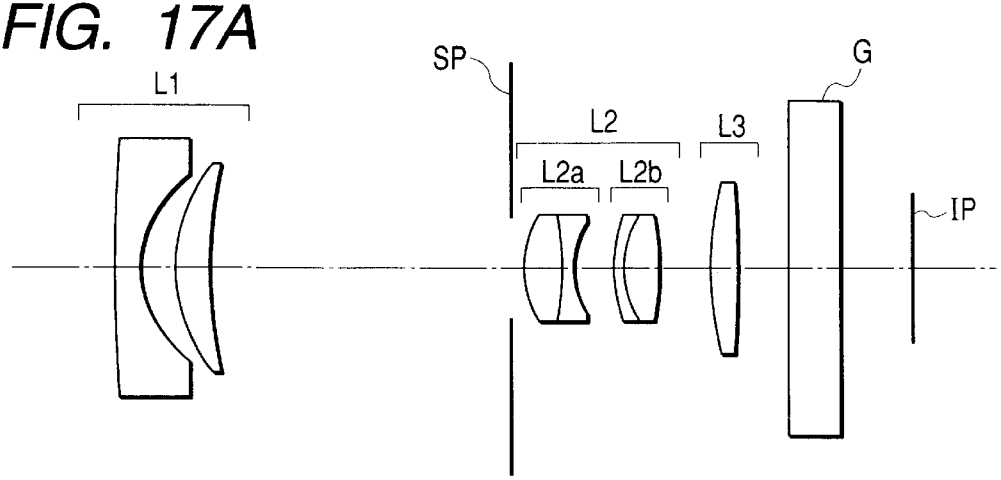
FIGS. 17A, 17B, and 17C are sectional views of a zoom lens in accordance with Numerical Embodiment 5.
Figure 17B:
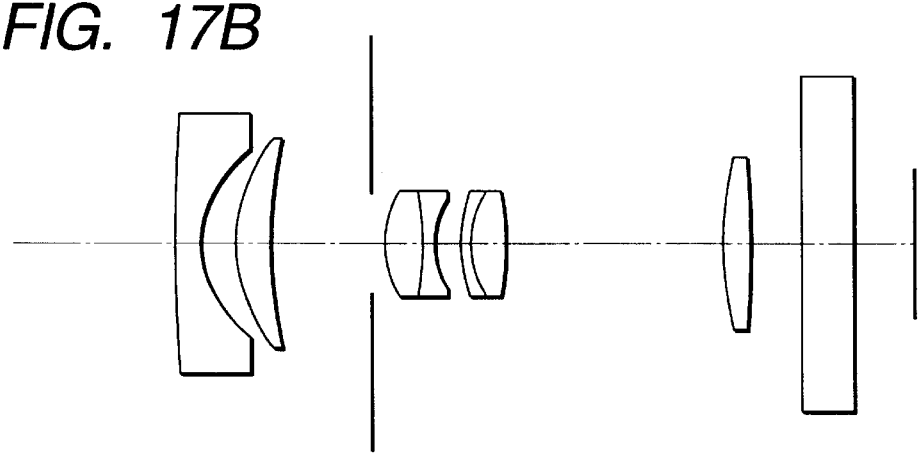
Figure 17C:
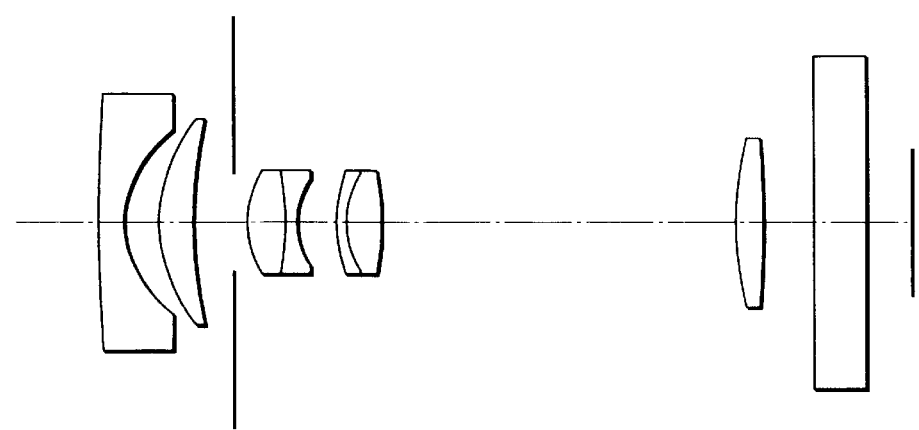

FIGS. 17A through 17C are sectional views showing a zoom lens in accordance with Numerical Embodiment 5 described below. FIGS. 18 through 20 are diagrams showing the aberration of the zoom lens of Numerical Embodiment 5 at the wide-angle end, the intermediate zoom position, and the telephoto end.

Figure 21A:
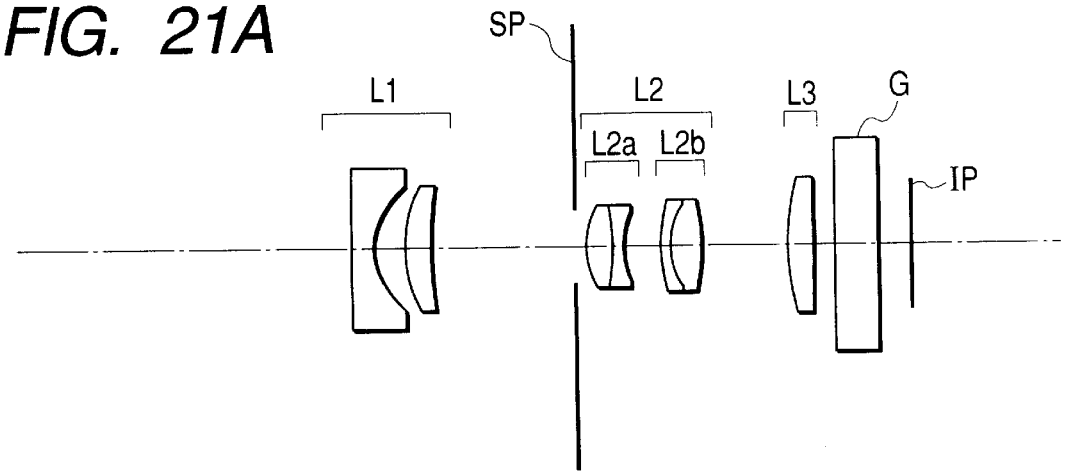
FIGS. 21A, 21B, and 21C are sectional views of a zoom lens in accordance with Numerical Embodiment 6.
Figure 21B:
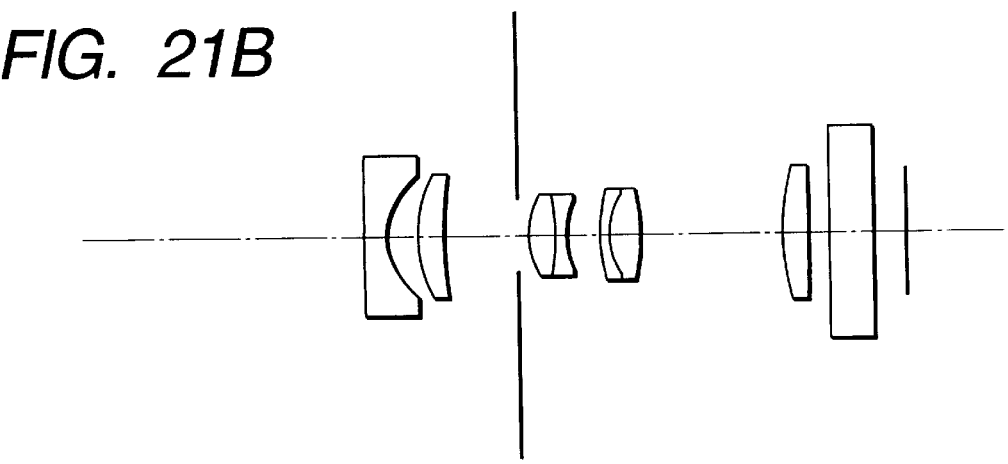
Figure 21C:
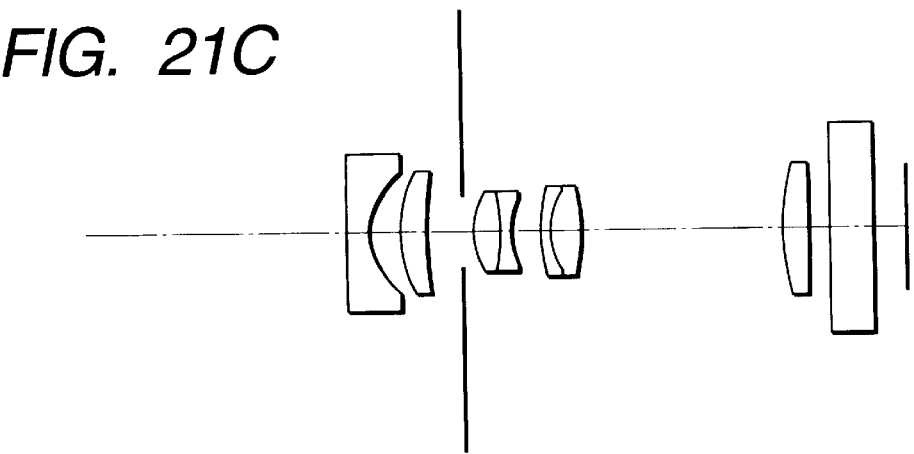

FIGS. 21A through 21C are sectional views showing a zoom lens in accordance with Numerical Embodiment 6 described below. FIGS. 22 through 24 are diagrams showing the aberration of the zoom lens of Numerical Embodiment 6 at the wide-angle end, the intermediate zoom position, and the telephoto end.

Figure 25A:
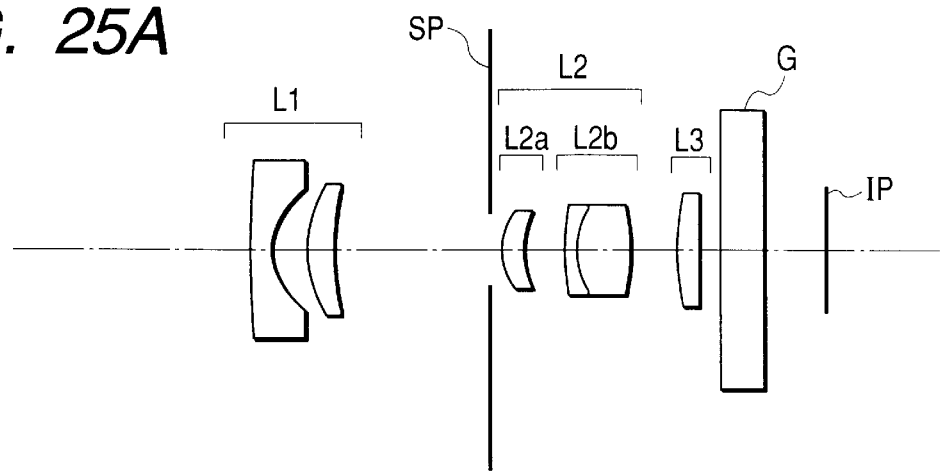
FIGS. 25A, 25B, and 25C are sectional views of a zoom lens in accordance with Numerical Embodiment 7.
Figure 25B:
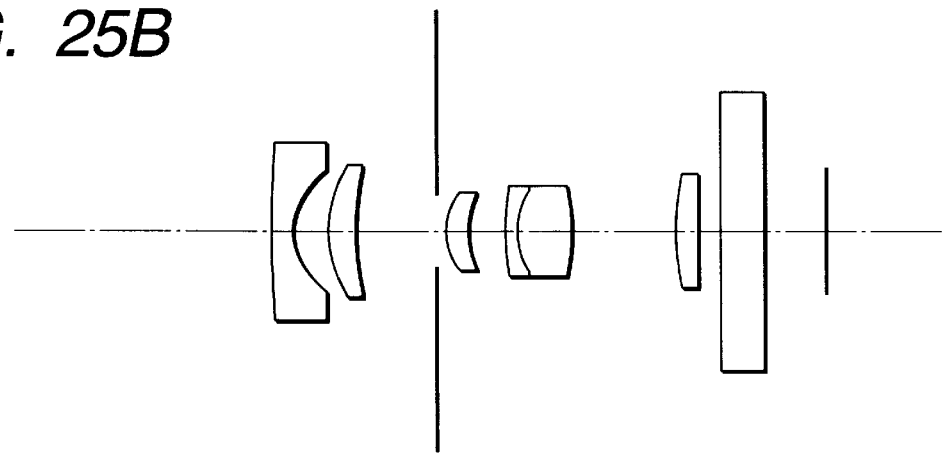
Figure 25C:
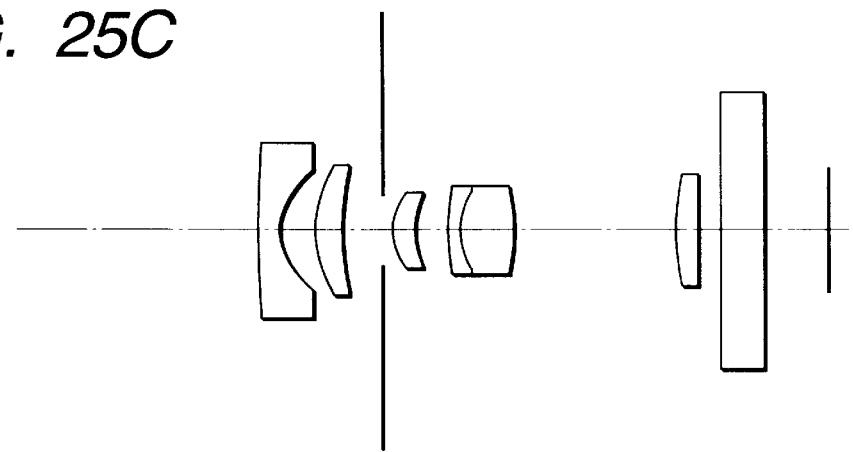
Figure 26:
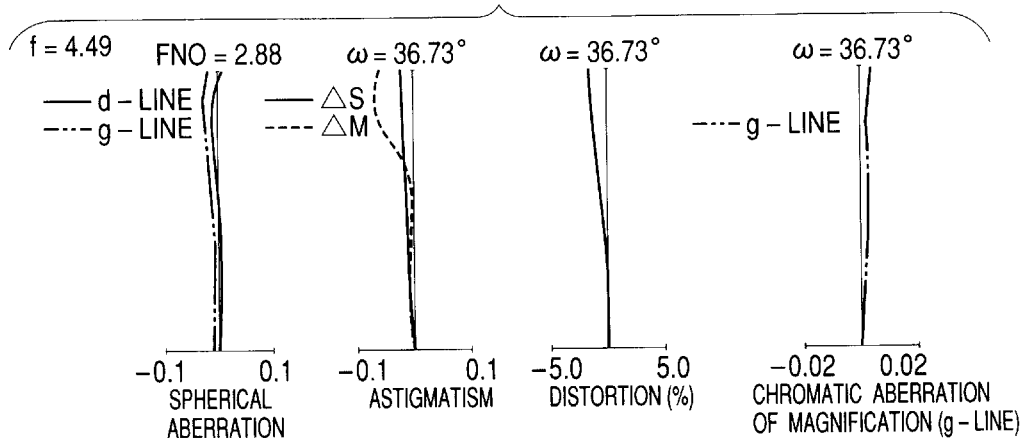
FIG. 26 is a diagram showing the aberration at the wide-angle end of the zoom lens of Numerical Embodiment 7.
Figure 27:
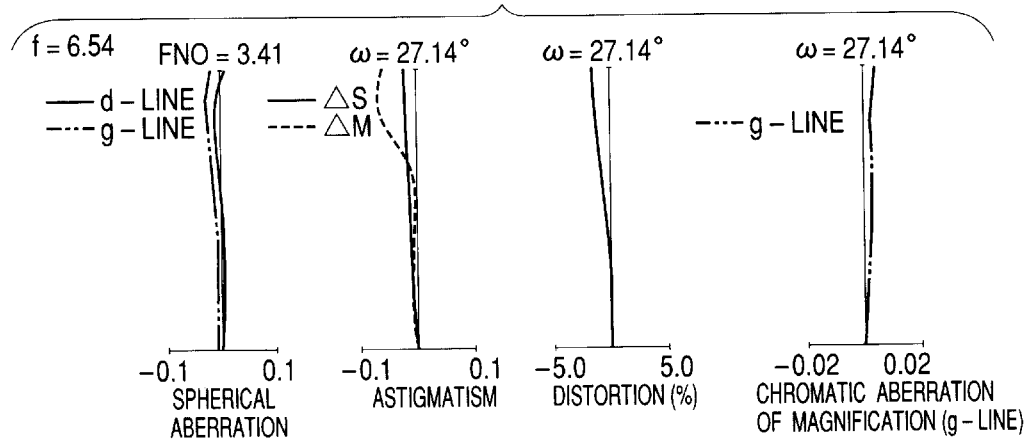
FIG. 27 is a diagram showing the aberration at the intermediate zoom position of the zoom lens of Numerical Embodiment 7.
Figure 28:
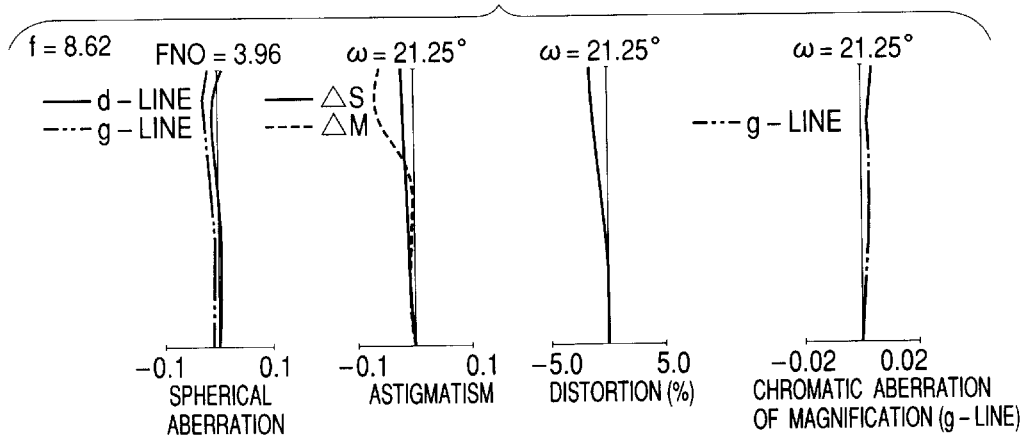
FIG. 28 is a diagram showing the aberration at the telephoto end of the zoom lens of Numerical Embodiment 7.

FIGS. 25A through 25C are sectional views showing a zoom lens in accordance with Numerical Embodiment 7 described below. FIGS. 26 through 28 are diagrams showing the aberration of the zoom lens of Numerical Embodiment 7 at the wide-angle end, the intermediate zoom position, and the telephoto end.

Figure 29A:
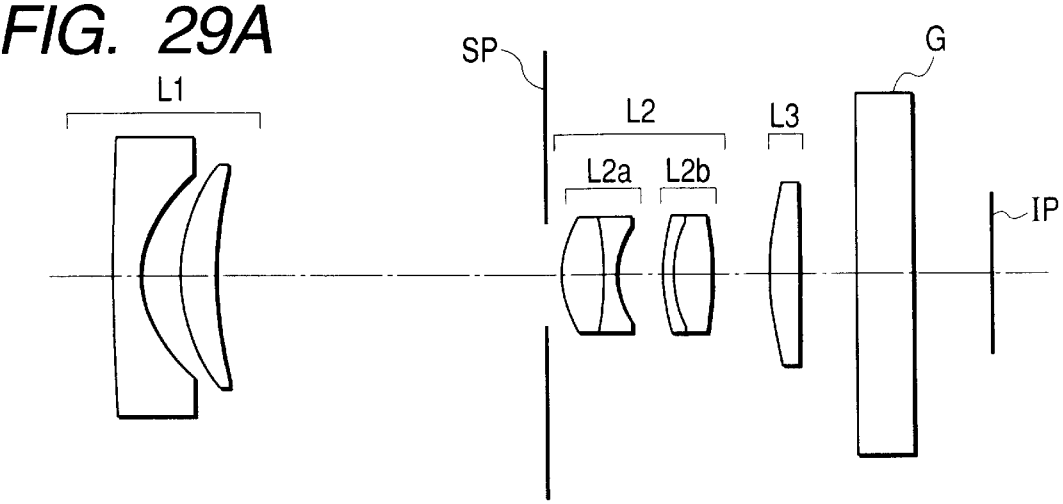
FIGS. 29A, 29B, and 29C are sectional views of a zoom lens in accordance with Numerical Embodiment 8.
Figure 29B:
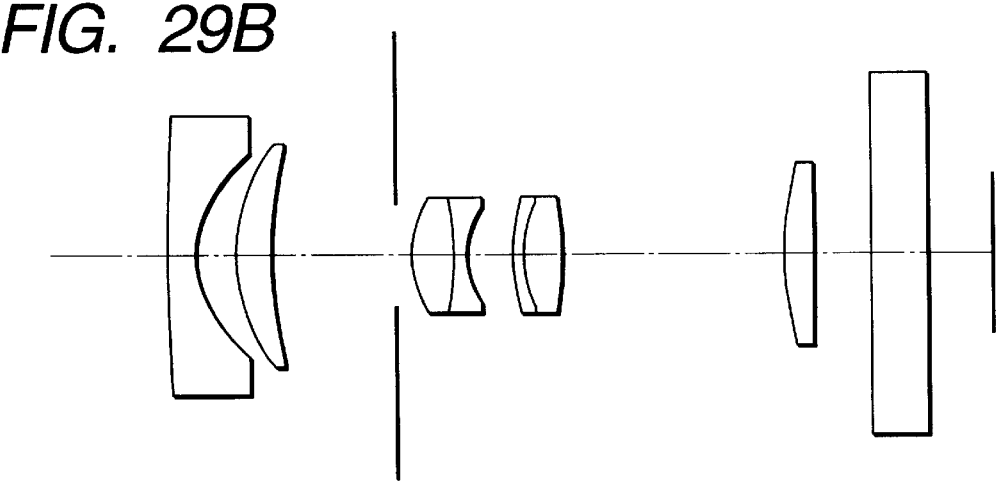
Figure 29C:
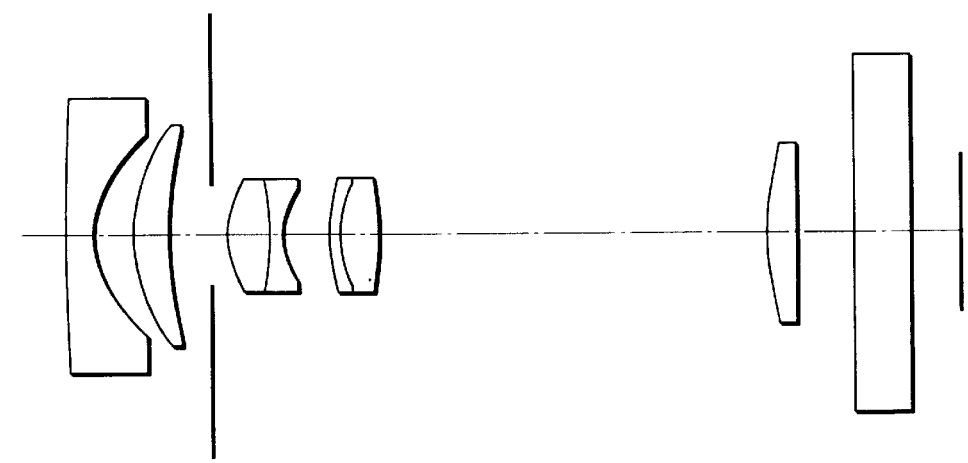
Figure 30:
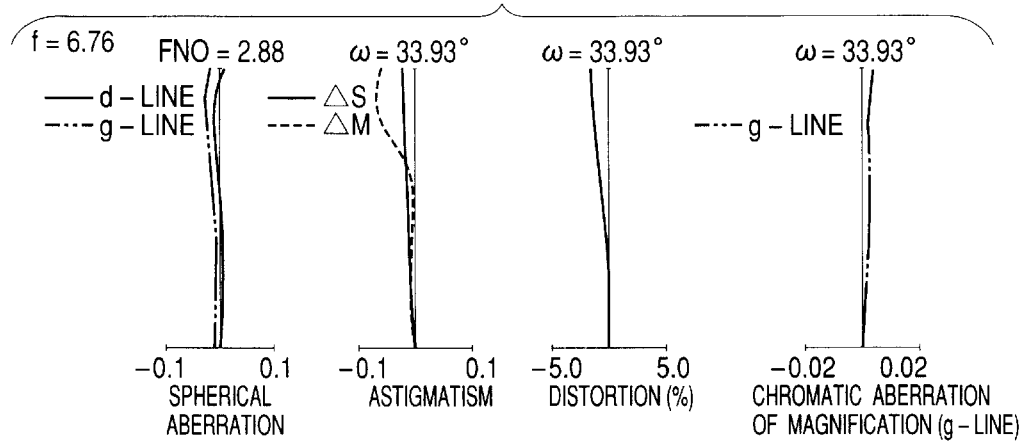
FIG. 30 is a diagram showing the aberration at the wide-angle end of the zoom lens of Numerical Embodiment 8.
Figure 31:
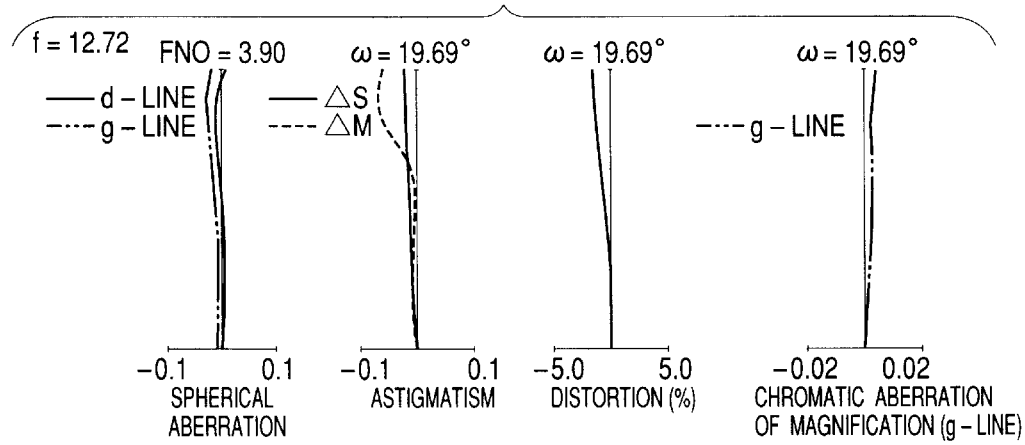
FIG. 31 is a diagram showing the aberration at the intermediate zoom position of the zoom lens of Numerical Embodiment 8.
Figure 32:
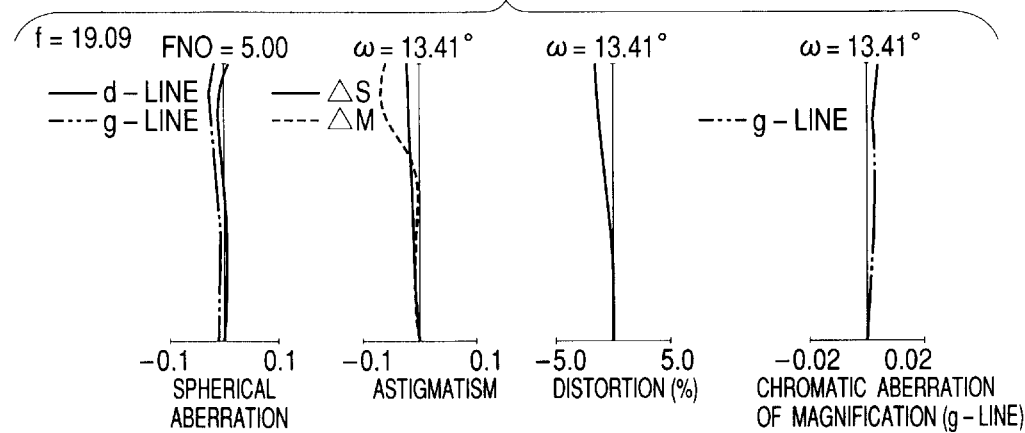
FIG. 32 is a diagram showing the aberration at the telephoto end of the zoom lens of Numerical Embodiment 8.

FIGS. 29A through 29C are sectional views showing a zoom lens in accordance with Numerical Embodiment 8 described below. FIGS. 30 through 32 are diagrams showing the aberration of the zoom lens of Numerical Embodiment 8 at the wide-angle end, the intermediate zoom position, and the telephoto end.

In respective zoom lenses of the numerical embodiments shown in sectional views of FIGS. 17, 21, 25, and 29, the components indicated by the same reference numerals as those of Embodiment 1 have the same functions as those of Embodiment 1.

The greatest difference between Embodiment 2 and Embodiment 1 is that, in Embodiment 2, focusing from an object at infinity to an object at a finite distance is conducted by moving the third lens unit L3.

In this way, by adopting a so-called rear focus system, in which focusing is effected by moving the third lens unit L3 that is small and light, it is easy to perform quick focusing, and, by appropriately setting the lens construction, fluctuation in aberration at the time of focusing is reduced.

It is also possible to move the third lens unit L3 during zooming. This makes it easy to reduce fluctuation in aberration in zooming.

Further, as in Embodiment 1, assuming that the air distance between the first lens sub unit L2a and the second lens sub unit L2b at the wide-angle end is d2abw, and that the focal length of the entire system at the wide-angle end is fw, the zoom lens of this embodiment satisfies the following condition:

$$0.2 < d2abw/fw < 1.0 \quad (1)$$

Further, assuming that the respective focal lengths of the second lens sub unit L2b and the third lens unit L3 are f2b and f3, this embodiment satisfies the following condition:

$$f2b < f3 \quad (4)$$

Conditional expression (4) relates to the relationship of the focal length between the second lens sub unit L2b and the third lens unit L3. By setting the focal length f3 larger than the focal length f2b as shown in conditional expression (4), it is possible to easily attain a system with further reduction in total length.

Further, it is desirable for f2b and f3 to satisfy the following condition:

$$1.1 < f3/f2b < 2.0 \quad (5)$$

If f3 is a large value to exceed the upper limit value of conditional expression (5), and the optical power of the third lens unit L3 becomes too weak, the moving amount (letting-out amount) of the third lens unit L3 at the time of focusing increases, with the result that the size of the entire system disadvantageously increases. On the other hand, if f2b is a large value to exceed the lower limit value of conditional expression (5), and the optical power of the second lens sub unit L2b becomes too weak, the fluctuation in the position of the exit pupil at the time of zooming increases disadvantageously.

Next, the zoom lens constructions of Numerical Embodiments 5 through 8 will be specifically described.

In Numerical Embodiments 5 through 8, the first lens unit L1 is composed of two lenses arranged in the following order as from the object side: a negative meniscus lens exhibiting a convex surface on the object side and an aspherical surface on the image side, and a positive meniscus lens having a convex surface on the object side.

In Numerical Embodiments 5, 6, and 8, the first lens sub unit L2a consists of a lens component formed by cementing together a positive lens having convex surfaces on both sides thereof and a negative lens having concave surfaces on both sides thereof and providing a positive optical power as a whole.

In Numerical Embodiment 7, the first lens sub unit L2a consists of a single positive meniscus lens having a convex surface on the object side.

In Numerical Embodiments 5 through 8, there is provided an aperture diaphragm SP on the object side of the first lens sub unit L2a, and the aperture diaphragm SP moves integrally with the first lens sub unit L2a at the time of zooming.

In Numerical Embodiments 5 through 8, there is arranged an aspherical surface on the surface of the first lens sub unit L2a nearest to the object side.

In Numerical Embodiments 5 through 8, the second lens sub unit L2b consists of a lens formed by cementing together a negative lens having a convex surface on the object side and a positive lens having convex surfaces on both sides thereof.

In Numerical Embodiments 5 through 8, the third lens unit L3 consists of a single positive lens.

In Numerical Embodiments 6 and 7, an aspherical surface is arranged on the object side of the positive lens of the third lens unit L3.

In zooming, the first lens unit L1 moves in a reciprocative type movement locus, and the position of the first lens unit is substantially the same at the wide-angle end and at the telephoto end, the unit moving in a locus convex on the image side.

Further, in all the numerical embodiments, the first and second lens sub units L2a and L2b move toward the object side in power variation from the wide-angle end to the telephoto end. In Numerical Embodiments 5 through 7, movement is effected while decreasing the distance between the first and second lens sub units L2a and L2b, and in Numerical Embodiment 8, movement is effected without changing the distance between the first and second lens sub units L2a and L2b.

In the following data on Numerical Embodiments 5 through 8 is shown.

Further, Table 2 shows the relationship between the above conditional expressions and the various values in Numerical Embodiments 5 through 8.

| Numerical Embodiment 5 | | | |
|---|---|---|---|
| f = 6.69~19.09  Fno = 2.88~5.00  2ω = 68.4~26.8 | | | |
| R1 = 184.449 | D1 = 1.50 | N 1 = 1.802380 | ν 1 = 40.8 |
| R2 = 5.841 | D2 = 2.19 | | |
| R3 = 10.532 | D3 = 2.00 | N 2 = 1.846659 | ν 2 = 23.8 |
| R4 = 32.426 | D4 = variable | | |
| R5 = diaphragm | D5 = 0.80 | | |
| R6 = 5.862 | D6 = 2.30 | N 3 = 1.802380 | ν 3 = 40.8 |
| R7 = −16.990 | D7 = 0.70 | N 4 = 1.713765 | ν 4 = 33.3 |
| R8 = 5.139 | D8 = variable | | |
| R9 = 11.058 | D9 = 0.60 | N 5 = 1.860320 | ν 5 = 28.6 |
| R10 = 6.247 | D10 = 2.15 | N 6 = 1.494054 | ν 6 = 69.5 |
| R11 = −17.178 | D11 = variable | | |
| R12 = 22.395 | D12 = 1.65 | N 7 = 1.487490 | ν 7 = 70.2 |
| R13 = −69.404 | D13 = variable | | |
| R14 = ∞ | D14 = 3.10 | N 8 = 1.516330 | ν 8 = 64.2 |
| R15 = ∞ | | | |

-continued

| Variable | Focal Length | | |
|---|---|---|---|
| Interval | 6.69 | 13.43 | 19.09 |
| D4 | 18.17 | 6.12 | 2.42 |
| D8 | 2.52 | 1.59 | 2.40 |
| D11 | 3.13 | 13.15 | 21.44 |
| D13 | 3.00 | 3.00 | 3.00 |

Aspherical Coefficient

| Second Surface: | $k = -2.13513e+00$ | $A = 0$ | $B = 8.30712e-04$ | $C = -9.70575e-06$ | $D = 7.05621e-08$ | $E = -5.14318e-10$ |
| Fourth Surface: | $k = 0.00000e+00$ | $A = 0$ | $B = 3.88722e-05$ | $C = -1.01838e-06$ | $D = 5.82592e-08$ | $E = -3.53652e-10$ |
| Eighth Surface: | $k = -2.15316e-01$ | $A = 0$ | $B = 1.56419e-04$ | $C = 1.37232e-07$ | $D = -3.99679e-07$ | $E = 1.44205e-08$ |

Numerical Embodiment 6
$f = 4.49\sim8.61$ Fno $= 2.88\sim4.06$ $2\omega = 73.5\sim42.5$

| R1 = 19726.824 | D1 = 1.10 | N 1 = 1.802380 | ν 1 = 40.8 |
|---|---|---|---|
| R2 = 3.408 | D2 = 1.61 | | |
| R3 = 7.398 | D3 = 1.31 | N 2 = 1.846659 | ν 2 = 23.8 |
| R4 = 23.544 | D4 = variable | | |
| R5 = diaphragm | D5 = 0.59 | | |
| R5 = 4.887 | D6 = 1.41 | N 3 = 1.743300 | ν 3 = 49.2 |
| R7 = −10.712 | D7 = 0.52 | N 4 = 1.530098 | ν 4 = 51.2 |
| R8 = 5.082 | D8 = variable | | |
| R9 = 9.625 | D9 = 0.44 | | |
| R10 = 4.010 | D10 = 1.62 | | |
| R11 = −9.603 | D11 = variable | N 5 = 1.846659 | ν 5 = 23.8 |
| R12 = 11.040 | D12 = 1.28 | N 6 = 1.500524 | ν 6 = 62.6 |
| R13 = 283.406 | D13 = 1.10 | | |
| R14 = ∞ | D14 = 2.28 | N 7 = 1.487000 | ν 7 = 70.4 |
| R15 = ∞ | | N 8 = 1.516330 | ν 8 = 64.2 |

| Variable | Focal Length | | |
|---|---|---|---|
| Interval | 6.69 | 13.43 | 19.09 |
| D4 | 7.45 | 3.80 | 1.89 |
| D10 | 1.93 | 1.74 | 1.55 |
| D13 | 4.33 | 7.29 | 10.26 |

Aspherical Coefficient

| Second Surface: | $k = 1.30000e+00$ | $A = 0$ | $B = 1.21009e-03$ | $C = -6.02818e-06$ | $D = -1.41438e-06$ | $E = 8.11980e-08$ |
| Sixth Surface: | $k = 6.85202e-03$ | $A = 0$ | $B = -1.11855e-03$ | $C = 1.43075e-05$ | $D = -8.93001e-06$ | $E = 7.60689e-07$ |
| 14th Surface: | $k = 0.00000e+00$ | $A = 0$ | $B = -5.15160e-04$ | $C = 2.60423e-05$ | $D = -2.42357e-06$ | $E = 1.05607e-07$ |

Numerical Embodiment 7
$f = 4.49\sim8.62$ Fno $= 2.88\sim3.96$ $2\omega = 73.5\sim42.5$

| R1 = 43.809 | D1 = 1.10 | N 1 = 1.743300 | ν 1 = 49.2 |
|---|---|---|---|
| R2 = 3.388 | D2 = 1.89 | | |
| R3 = 7.510 | D3 = 1.40 | N 2 = 1.846659 | ν 2 = 23.8 |
| R4 = 15.849 | D4 = variable | | |
| R5 = diaphragm | D5 = 0.59 | | |
| R6 = 4.225 | D6 = 1.20 | N 3 = 1.743300 | ν 3 = 49.2 |
| R7 = 7.542 | D7 = variable | | |
| R8 = 15.632 | D8 = 0.60 | N 4 = 1.846659 | ν 4 = 23.8 |
| R9 = 4.095 | D9 = 2.88 | N 5 = 1.570989 | ν 5 = 50.8 |
| R10 = −10.469 | D10 = vairable | | |
| R11 = 16.000 | D11 = 1.11 | N 6 = 1.693500 | ν 6 = 53.2 |
| R12 = 96.804 | D12 = 1.10 | | |
| R13 = ∞ | D13 = 2.28 | N 7 ' 1.516330 | ν 7 = 64.2 |
| R14 = ∞ | | | |

-continued

| Variable | Focal Length | | |
|---|---|---|---|
| Interval | 4.49 | 6.54 | 8.62 |
| D4 | 8.09 | 4.09 | 1.98 |
| D7 | 2.12 | 1.90 | 1.68 |
| D10 | 2.35 | 5.38 | 8.42 |
| Aspherical Coefficient | | | |
| Second Surface: k = −1.26655e+00 A= 0 B = 1.36048e−03 C = 5.59113e−05 D = −7.31206e−06 E = 3.07291e−07 | | | |
| Sixth Surface: k = −3.69906e−01 A = 0 B = 2.44272e−03 C = 2.46121e−04 D = 2.35484e−05 E = 1.61948e−06 | | | |
| Seventh Surface: k = 0.00000e+00 A = 0 B = 4.48079e−03 C = 3.41112e−04 D = 7.09351e−05 E = 5.42141e−06 | | | |
| 11th Surface: k = 0.00000e+00 A = 0 B = −4.18680e−04 C = 3.37068e−05 D = −4.97321e−06 E = 2.65887e−07 | | | |

Numerical Embodiment 8
f = 6.76~19.09 Fno = 2.88~5.00 2ω = 67.8~26.8

| R1 = 140.621 | D1 = 1.50 | N 1 = 1.802380 | ν 1= 40.8 |
|---|---|---|---|
| R2 = 5.801 | D2 = 2.20 | | |
| R3 = 10.507 | D3 = 2.00 | N 2 = 1.846659 | ν 2 = 23.8 |
| R4 = 31.769 | D4 = variable | | |
| R5 = diaphragm | D5 = 0.8O | | |
| R6 = 5.874 | D6 = 2.41 | N 3 = 1.802380 | ν 3 = 40.8 |
| R7 = −15.021 | D7 = 0.70 | N 4 = 1.713765 | ν 4 = 32.5 |
| R8 = 4.991 | D8 = 2.52 | | |
| R9 = 11.021 | D9 = 0.60 | N 5 = 1.860320 | ν 5 = 28.6 |
| R10 = 6.718 | D10 = 2.15 | N 6 = 1.494054 | ν 6 = 69.5 |
| R11 = −18.053 | D11 = variable | | |
| R12 = 20.893 | D12 = 1.65 | N 7 = 1.487490 | ν 7 = 70.2 |
| R13 = −111.058 | D13 = variable | | |
| R14 = ∞ | D14 = 3.10 | N 8 = 1.516330 | ν 8 = 64.2 |
| R15 = ∞ | | | |

| Variable | Focal Length | | |
|---|---|---|---|
| Interval | 4.49 | 6.54 | 8.62 |
| D4 | 18.17 | 6.77 | 2.42 |
| D11 | 3.23 | 12.24 | 21.25 |
| D13 | 3.00 | 3.00 | 3.00 |
| Aspherical Coefficient | | | |
| Second Surface: k = −2.07337e+00 A = 0 B = 8.01568e−14 C = −8.25158e−06 D =8.57719e−08 E = −1.48257e−09 | | | |
| Fourth Surface: k = 0.00000e+00 A = 0 B = 4.66298e−05 C = −1.38758e−06 D = 3.82302e−08 E = 4.40160e−10 | | | |
| Sixth Surface: k = −1.96956e−01 A = 0 B = −1.64445e−04 C = 3.22940e−01 D = −4.35061e−07 E = 1.44205e−08 | | | |

TABLE 2

| | | Numerical Embodiment | | | |
|---|---|---|---|---|---|
| Conditional expression | | 5 | 6 | 7 | 8 |
| (1) | dabw/fw | 0.46 | 0.28 | 0.47 | 0.37 |
| (4) | f2b | 20.9 | 18.4 | 23.4 | 19.8 |
| | f3 | 34.9 | 23.6 | 27.5 | 36.2 |
| (5) | f3/f2b | 1.67 | 1.28 | 1.18 | 1.83 |

Third Embodiment

Next, an embodiment of a digital camera using a zoom lens according to Embodiments 1 and 2 as the photographic optical system will be described with reference to FIG. 33.

Figure 33:
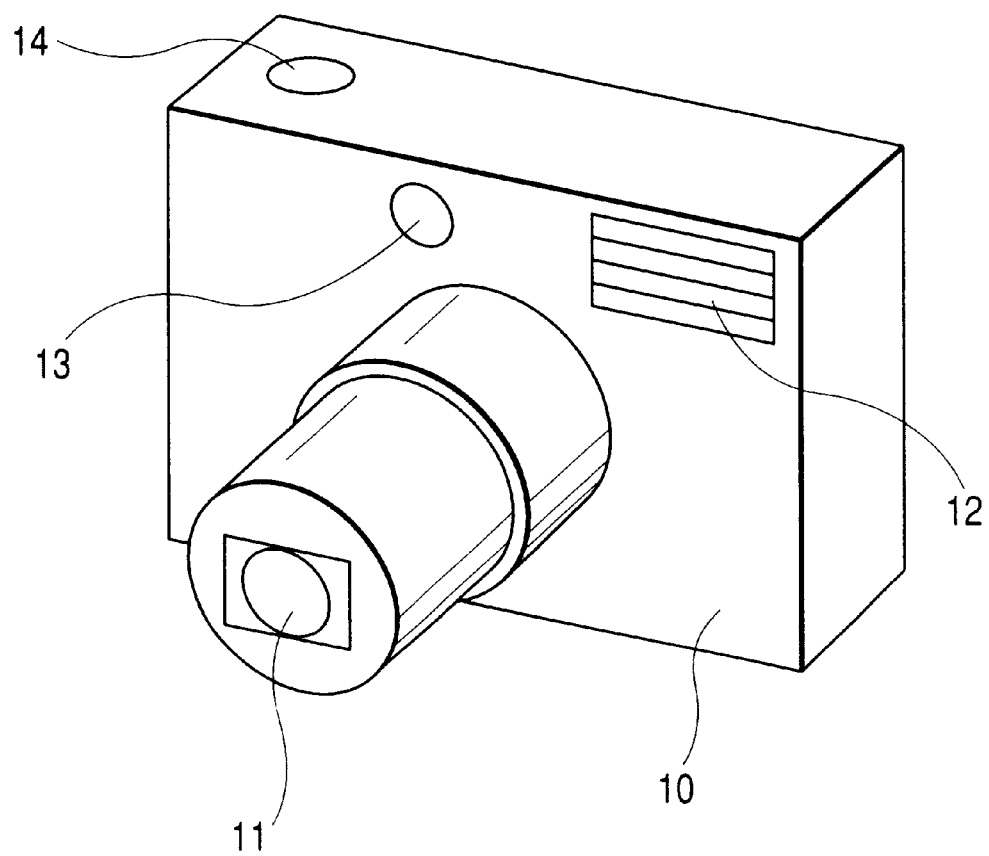
FIG. 33 is a schematic diagram showing a digital camera.

In FIG. 33, numeral 10 indicates a camera main body, numeral 11 indicates a photographic optical system formed by a zoom lens according to Embodiments 1 and 2 described above, numeral 12 indicates a built-in flash provided in the camera main body, numeral 13 indicates an exterior-type finder, and numeral 14 indicates a shutter button.

In the photographic optical system 11, an image of a subject is formed on a solid-state image sensor (not shown) and is recorded as electrical information.

By thus applying the zoom lens of the present invention to an optical apparatus, such as a digital camera, it is possible to realize a small optical apparatus having a high optical performance.

In accordance with the embodiments described above, it is possible to realize a compact zoom lens composed of a small number of lenses and having a superior optical performance and an optical apparatus using the same.

In particular, in a zoom lens having three lens units in a negative-positive-positive optical power arrangement, through optimum setting of the lens construction of each lens unit, the position of the aspherical surface when the aspherical surface is employed, the manner of moving the lens units in zooming, and the focusing method, it is possible to realize a zoom lens in which the number of lenses of the entire system is reduced to reduce the total lens length, which has a variable power ratio of approximately 3, which is bright and of high optical performance and includes a wide-angle range, and which is suited for a digital still camera, a video camera or the like, and an optical apparatus using the same.

What is claimed is:

1. A zoom lens comprising, in order from an object side to an image side:

a first lens unit of a negative optical power;

a second lens unit of a positive optical power, the second lens unit consisting of a first lens sub unit of a positive optical power arranged on the object side and a second lens sub unit of a positive optical power arranged on the image side with respect to a maximum gap in the second lens unit; and a third lens unit of a positive optical power, wherein zooming is effected by moving the lens units such that the distance between the lens unit and the second lens unit is smaller at a telephoto end than at a wide-angle end and that the distance between the second lens unit and the third lens unit is larger at the telephoto end than at the wide-angle end, wherein focusing is effected by moving the second lens sub unit or the third lens unit, and wherein, when focusing is effected on an object at infinity at the wide-angle end, assuming that the distance between the first lens sub unit and the second lens sub unit is d2abw and that the focal length of the entire system at the wide-angle end is fw, the following condition is satisfied:

$$0.2 d2abw/fw<1.0;$$

and wherein, assuming that the respective focal lengths of the second lens sub unit and the third lens unit are f2b and f3, the following condition is satisfied:

$$f2b<f3.$$

2. A zoom lens according to claim 1, wherein a beam emitted from the first lens sub unit at the telephoto end is substantially afocal, and wherein, assuming that the image formation magnification of the second lens sub unit when focusing is effected on an object at infinity at the telephoto end is β2bt, the following condition is satisfied:

$$+0.30<\beta2bt<0.55.$$

3. A zoom lens according to Claim 1, wherein, assuming that the respective distances between the first lens sub unit and the second lens sub unit at the wide-angle end and at the telephoto end when focusing is effected on an object at infinity are d2abw and d2abt, and that the respective distances between the first lens sub unit and the second lens sub unit at the wide-angle end at the telephoto end when focusing is effected on an object at distance of 500 x fw are d2abw#of and d2abt#of, the following condition is satisfied:

$$(d2abt-d2abt\#of)>(d2abw-d2abw\#of).$$

4. A zoom lens according to claim 1, wherein when effecting zooming from the wide-angle end to the telephoto end, the distance between the first lens sub unit and the second lens sub unit changes.

5. A zoom lens according to claim 1, further comprising an aperture diaphragm adapted to move integrally with the first lens sub unit during zooming.

6. A zoom lens according to claim 5, wherein said aperture diaphragm is arranged on the object side of the first lens sub unit.

7. A zoom lens according to Claim 1, wherein the first lens unit consist of a negative lens element having an aspherical surface and a positive lens element 8. A worn lens according to claim 1, wherein the first lens sub unit has at least one cemented lens formed by cementing together a positive lens element and a negative lens element.

9. A zoom lens according to claim 1, wherein the first lens sub unit has at least two positive lens elements.

10. A zoom lens according to Claim 1, wherein the second lens sub unit consists of a unitary lens component.

11. A zoom lens according Claim 10, wherein the second lens sub unit consists of single lens element.

12. A zoom lens according to Claim 10, wherein the second lens sub unit consists of a cemented lens.

13. A zoom lens according to claim 1, wherein the third lens unit consists of a single lens element.

14. A zoom lens according to claim 1, wherein the third lens unit does not move for zooming.

15. A zoom lens according to claim 1, wherein, assuming that the respective focal length of the second lens sub unit and the third lens unit are f2b and f3, the following condition is satisfied:

$$1.1<f3/f2b<2.0.$$

16. A zoom lens according to claim 1, further comprising an aperture diaphragm adapted to move integrally with the first lens sub unit during zooming.

17. A zoom lens according to claim 16, wherein said aperture diaphragm is arranged on the object side of the first lens sub unit.

18. An optical apparatus comprising:

a zoom lens as claimed in claim 1; and a solid-state image sensor for receiving an image formed by said zoom lens.

19. A zoom lens comprising, in order from an object side to an image side:

a first lens unit of a negative optical power the first lens unit consisting of a negative lens element and a positive lens element;

a second lens unit of a positive optical power, the second lens unit consisting of a first lens sub unit of a positive optical power arranged on an object side and a second lens sub unit of a positive optical power arranged on an image side with respect to a maximum gap in the second lens unit; and a third lens unit of a positive optical power, wherein zooming is effected by moving the lens unit such that the distance between the first lens unit and the second lens unit is smaller at a telephoto end than at a wide-angle end and that the distance between the second lens unit and the third lens unit is larger at the telephoto end than at the wide-angle end, wherein focusing is effected by moving the second lens sub unit, wherein a beam emitted from the first lens sub unit at the telephoto end is substantially afocal, and wherein, assuming that the image formation magnification of the second lens sub unit when focusing is effected on an object at infinity at the telephoto end is μ2bt, the following condition is satisfied:

$$+0.30 < \mu 2bt < 0.55.$$

20. A zoom lens according to claim 19, wherein, assuming that the respective distances between the first lens sub unit and the second lens sub unit at the wide-angle end and at the telephoto end when focusing is effected on an object at infinity are d2abw and d2abt, and that the respective distances between the first lens sub unit and the second lens sub unit at the wide-angle end and at the telephoto end when focusing is effected on an object at distance of 500 x fw are d2abw#db and d2ab#of, the following condition is satisfied:

$$(d2abt-d2abt\#of < (d2abw-2abw\#of).$$

21. A zoom lens according to claim 19, wherein when effecting zooming from the wide-angle end to the telephoto end, the distance between the first lens sub unit and the second lens sub unit changes.

22. A zoom lens according to claim 17, wherein said negative lens element in the first lens element in the first lens unit has an aspherical surface.

23. A zoom lens according to claim 17, wherein the first lens sub unit has at least one cemented lens formed by cementing together a positive lens element and a negative lens element.

24. A zoom lens according to claim 17, wherein the first lens sub unit has at least two positive lens elements.

25. A zoom lens according to claim 17, wherein the second lens sub unit consists of a unitary lens component.

26. A zoom lens according to claim 25, wherein the second lens sub unit consists of a single lens element.

27. A zoom lens according to claim 25, wherein the second lens sub unit consists of a cemented lens.

28. A Zoom lens according to claim 17, wherein the third lens unit consists of a cemented lens.

29. A zoom lens according to claim 17, wherein the third lens unit does not move for zooming.

30. An optical apparatus comprising:
a zoom lens as claimed in claim 17; and
a solid-state image sensor for receiving an image formed by said zoom lens.

31. A zoom lens comprising, in order from an object side to an image side:
a first lens unit of a negative optical power, the first lens unit consisting of a negative lens element and a positive lens element;
a second lens unit of a positive optical power, the second lens unit consisting of a first lens sub unit of a positive optical power arranged on the object side and a second lens sub unit of a positive optical power arranged on the image side with respect to a maximum gap in the second lens unit; and a third lens unit of a positive optical power, wherein zooming is effected by moving the lens units such that the distance between the first lens unit and the second lens unit is smaller at a telephoto end than at a wide-angle end and that the distance between the second lens unit and the third lens unit is larger at the telephoto end than at the wide-angle end, wherein focusing is effected by moving the second lens sub unit or the third lens unit, wherein an object side surface of lens element in the first lens unit nearest to the object side has a convex shape, and an object side surface of a lens element in the third lens unit nearest to the object side has a convex shape, and wherein, when focusing is effected on an object at infinity at the wide-angle end, assuming that the distance between the first lens sub unit and the second lens sub unit is d2abw and hat the focal length of the entire system at the wide-angle end is fw, the following condition is satisfied:

$$0.2 < d2abw/fw < 1.0.$$

32. An optical apparatus comprising:
a zoom lens as recited in claim 31; and
a solid-state image sensor for receiving an image formed by said zoom lens.

33. A zoom lens comprising, in order from an object side to an image side:
a first lens unit of a negative optical power, the first lens unit consisting of a negative lens element and a positive lens element:
a second lens unit of a positive optical power, the second lens unit consisting of a first lens sub unit of a positive optical power arranged on the object side and a second lens sub unit of a positive optical power arranged on the image side with respect to a maximum gap in the second lens unit: and
a third lens unit of a positive optical power, wherein zooming is effected by moving the lens units such that the distance between the first lens unit and the second lens unit is smaller at a telephoto end than at a wide-angle end and that the distance between the second lens unit and the third lens unit is larger at the telephoto end than at the wide-angle end, wherein focusing is effected by moving the second lens sub unit or the third lens unit, wherein an object side surface of a lens element in the second lens unit nearest to the object side has a convex shape, and an object side surface of a lens element in the third lens unit nearest to the object side has a convex shape, and wherein, when focusing is effected on an object at infinity at the wide-angle end assuming that the distance between the first lens sub unit and the second lens sub unit is d2abw and that the focal length of the entire system at the wide-angle end is fw, the following condition as satisfied:

$$0.2 < d2abw/f1 < 1.0.$$

34. An optical apparatus comprising:
a zoom lens as recited in claim 33; and
a solid-state image sensor for receiving an image formed by said zoom lens.

35. A zoom lens comprising, in order from an object side to an image side:

a first lens unit of a negative optical power;

a second lens unit of a positive optical power, the second lens unit consisting of a first lens sub unit of a positive optical power arranged on an object side and a second lens sub unit of a positive optical power arranged on an image side with respect to a maximum gap in the second lens unit; and a third lens units of a positive optical power, wherein zooming is effected by moving the lens units such that the distance between the first lens unit and the second lens unit is smaller at a telephoto end than at a wide-angle end and that the distance between the second lens unit and the third lens unit is larger at the telephoto end than at the wide-angle end, wherein an object side surface of a lens element in the second lens sub unit nearest to the object side has a convex shape, wherein focusing is effected by moving the second lens sub unit, wherein a beam emitted from the first lens sub unit at the telephoto end is substantially afocal, and wherein, assuming than the image formation magnification of the second lens sub unit when focusing is effected on an object at infinity at the telephoto end is β2bt, the following condition is satisfied:

$$+0.30 < \beta 2bt < 0.55.$$

36. An optical apparatus comprising:
a zoom lens as recited in claim 35; and
a solid-state image sensor for receiving an image formed by said zoom lens.

37. A zoom lens comprising, in order from an object side to an image side:

a first lens unit of a negative optical power;

a second lens unit of a positive optical power, the second lens unit consisting of a first lens sub unit of a positive optical power arranged on an object side and a second lens sub unit of a positive optical power arranged on an image side with respect to a maximum gap in the second lens unit; and a third lens units of a negative optical power, the third lens unit consisting of a positive lens element forming a biconvex shape, wherein zooming is effected by moving the lens units such that the distance between the first lens unit and the second lens unit is smaller at a telephoto end than at a wide-angle end and that the distance between the second lens unit and the third lens unit is larger at the telephoto end than at the wide-angle end, wherein focusing is effected by moving the second lens sub unit, wherein a beam emitted from the first lens sub unit at the telephoto end is substantially afocal, and wherein, assuming that the image formation magnification of the second lens sub unit when focusing is effected on an object at infinity at the telephoto end is β2bt, the following condition is satisfied:

$$+0.30 < \beta 2bt < 055.$$

38. An optical apparatus comprising:
a zoom lens as recited in claim 37; and
a solid-state image sensor for receiving an image formed by said zoom lens.

* * * * *